(12) United States Patent
Greenwald et al.

(10) Patent No.: US 6,363,821 B1
(45) Date of Patent: Apr. 2, 2002

(54) ON-VEHICLE DISK BRAKE LATHE

(75) Inventors: Christopher L. Greenwald, Concord; Jeffrey P. Hastings, Hanover, both of NH (US)

(73) Assignee: Pro-Cut Licensing, LLC, West Lebanon, NH (US)

( * ) Notice: Subject to any disclaimer, the term of this patent is extended or adjusted under 35 U.S.C. 154(b) by 0 days.

(21) Appl. No.: 09/588,259

(22) Filed: Jun. 6, 2000

(51) Int. Cl.[7] .............................. B23B 5/04; B23B 1/00
(52) U.S. Cl. ..................... 82/1.11; 82/47; 82/112
(58) Field of Search ................ 82/112, 1.11, 46, 82/47, 48, 118, 138

(56) References Cited

U.S. PATENT DOCUMENTS

| | | | |
|---|---|---|---|
| 5,419,222 A | | 5/1995 | Bieg ............................ 82/1.11 |
| 5,499,563 A | | 3/1996 | Hansen ......................... 82/112 |
| 5,549,023 A | * | 8/1996 | Strout et al. ................... 82/112 |
| 5,653,153 A | * | 8/1997 | Greenwald .................... 82/1.11 |
| 5,765,457 A | | 6/1998 | Meyer et al. .................. 82/112 |
| 6,101,911 A | * | 8/2000 | Newell et al. ................. 82/112 |
| 6,216,571 B1 | * | 4/2001 | Newell et al. ................ 82/1.11 |

FOREIGN PATENT DOCUMENTS

CA          2071031          1/1993

* cited by examiner

Primary Examiner—Henry Tsai
(74) Attorney, Agent, or Firm—Michael J. Weins; Jeffrey E. Semprebon

(57) ABSTRACT

A disk brake lathe has a pair of tool bits mounted to tool holders which are translatable parallel to a lathe axis to adjust the separation of the tool bits from a brake disk. A displacement gauge responds to changes in the separation between the tool holders. When the tool bits are in continuous contact with the disk, the separation indicates the thickness which would result from machining the disk. This separation can be compared to a specification to determine whether to machine or discard the disk. A method for machining a disk starts by mounting and aligning the lathe to a wheel hub on which the disk is mounted. The tool bits are each advanced until they are in continuous contact the disk surfaces, when the separation of the tool bits is measured and preferably compared to a specification. When the tool bits are sequentially advanced, variation in the separation can be used to determine depth of cut for each tool bit. A system employing a brake lathe has a microprocessor which receives signals responsive to the separation between the tool bits of the lathe. One or more contact sensors indicate contact of the tool bits with the other tool bit or the brake disk, and the microprocessor can implement instructions to practice the above method. A surface displacement gauge can be employed to allow the system to measure the thickness and lateral run-out of the disk prior to machining.

37 Claims, 12 Drawing Sheets

ON-VEHICLE DISK BRAKE LATHE

FIELD OF THE INVENTION

The present invention relates to an on-vehicle disk brake lathe which can provide an indication of the depth of cut on the surfaces of the disk, determine the lateral runout of the disk, and monitor the thickness of the disk which will result when the disk is machined.

BACKGROUND OF THE INVENTION

There are a variety of measuring devices that are currently used in combination with bench lathes that allow monitoring of the surface being cut or, alternatively, measuring the position of the cutting tip. U.S. Pat. No. 5,765,457 provides an example of a bench lathe which provides a measuring system for determining the position of one or more cutting tips relative to a reference position that allows one to back out the depth of cut. The '457 patent also teaches that, when the positions of both cutting tips are measured relative to a reference plane, one can calculate the thickness of the disk and determine a priori whether the disk is sufficiently thick that it can be machined to bring it into specification.

While the teaching of the '457 patent offers a solution for machining of brake disks on a bench lathe, there is no teaching of the use of such a mechanism on an on-vehicle lathe. Furthermore, the system requires the use of two sensors and a complex algorithm to ascertain the position of the cutting tips, and from this information supplemental calculations are needed to determine the thickness of the disk.

Thus, there is a need for an on-vehicle brake lathe which employs rudimentary hardware to determine both depth of cut and whether a disk brake can be machined to bring it within the specifications of the manufacturer.

OBJECTS OF THE INVENTION

It is an object of the invention to provide an on-vehicle disk brake lathe that will determine the thickness of a resurfaced brake before the disk brake is resurfaced.

It is another object of the invention to determine the thickness of the disk brake using a single displacement gauge.

It is another object of the invention to provide a compact on-vehicle disk brake lathe which can be readily adjusted.

It is yet another object of the invention to provide a cutting tool assembly which can be retrofitted to an on-vehicle disk brake lathe for determining the depth of cut and disk thickness.

It is a further object of the invention to provide a method for determining the depth of cut of a tool bit for an on-vehicle disk brake lathe which employs a single displacement gauge.

It is still a further object of the invention to develop a method for resurfacing brake disks which allows an operator to qualify the brake disk for resurfacing before such is undertaken.

It is a further object of the invention to develop an automated brake disk machining system which reduces the likelihood of operator error.

SUMMARY OF THE INVENTION

The present invention relates to on-vehicle disk brake maintenance, and more particularly to an improved on-vehicle disk brake lathe of the type which is mounted to a wheel hub which, along with a brake disk, rotates about a hub axis; related methods for the machining to resurface disk brakes while they remain on the vehicle; and a system suitable for practicing the method of the present invention and automating the on-vehicle disk brake lathes of the present invention.

The on-vehicle disk brake lathe of the present invention relates to an improved cutting tool assembly for holding a first tool bit for resurfacing a first disk surface of the disk and a second tool bit for resurfacing a second disk surface of the disk. The cutting tool assembly can be either an integral part of an on-vehicle disk brake lathe or can be retrofitted to an existing on-vehicle disk brake lathe. In either case, the disk brake lathe has a lathe frame attachable to the wheel hub, a means for aligning a lathe axis with the hub axis, a drive mechanism for rotating the wheel hub and the brake disk about the lathe axis, and means for advancing the tool bits along a feed path which is normal to the lathe axis.

The improved cutting tool assembly for the on-vehicle disk brake lathe described above includes a first tool holder to which the first tool bit is mounted. The first tool holder is translatably engaged with respect to the lathe frame such that it traverses a first tool holder path which is parallel to the lathe axis. Means for moving the first tool holder along the first tool holder path are provided to allow adjusting the spatial separation between the first tool bit and the first disk surface.

A second tool holder is provided to which the second tool bit is mounted. The second tool holder is translatably engaged with respect to the lathe frame such that it traverses a second tool holder path which is parallel to the lathe axis, and means for moving the second tool holder along the second tool holder path so as to adjust the spatial separation between the second tool bit and the second disk surface are provided.

The means for moving the first tool holder and the second tool holder may be any of a variety of mechanical and electromechanical activating devices such as screw mechanisms, stepping motors, servos, rack-and-pinion mechanisms, and hydraulic or pneumatic actuators.

A displacement gauge is positioned relative to the first tool holder and the second tool holder so as to respond to changes in the spatial separation therebetween and to provide an output signal proportional to the separation. Gauges which are capable of providing such a response are further described in U.S. Pat. No. 5,970,427, assigned to the assignee of the present application.

Means for reporting the output signal of the displacement gauge are provided, which can typically be a display, printer, memory device or microprocessor. Frequently, these means are an integral part of commercially available gauges. When a microprocessor is employed, the signal provided to the microprocessor should be a digital signal, which can be either the inherent output of the displacement gauge or, alternatively, can be provided by an A/D converter.

It is further preferred that means for coordinating the motion of the tool holders be provided. Such means can be electronic or mechanical in nature, or can be a combination of electrical circuits and mechanical devices.

It is also preferred for the improved cutting tool assembly to have means for providing pair-wise displacement of the tool holders with respect to the brake disk. One preferred means for providing pair-wise movement of the tool holders, which is partly mechanical, is to employ a support plate which is translatably attached with respect to a platform and traverses a path that is parallel to the lathe axis, while the platform moves along the feed path normal to the lathe axis. The support plate in turn supports the tool holders, of which at least one is slidably engaged therewith such that its tool holder path is parallel to the path of the support plate.

When a support plate is employed, means for positioning the support plate relative to the disk are provided. In an elementary manner, this might be done by hand; however, mechanical means are preferred. A jack screw which is turned by a crank handle is an example of one such means which could be employed. Alternatively, a rack and pinion could be substituted for the jack screw, and the crank handle which is turned by the operator could be replaced with a servo mechanism.

When means for positioning the tool holders do not provide sufficient inherent structure to assure that the tool holders remain axially fixed with respect to the lathe frame as the tool bits traverse the disk surfaces, supplemental means for maintaining each of the tool holders in a fixed axial position relative to the frame are preferably provided to hold the tool holders in position while the tool bits are advanced across the disk brake surface being machined.

While the above described cutting head assembly and on-vehicle brake lathe is capable of determining the thickness of a machined disk brake, the displacement gauge must be calibrated to provide measurements of thickness. This can be done by having the operator bring the two tool bits into contact with each other prior to placing the tool bits around the brake disk. The operator notes the displacement gauge reading at this point, thereafter separates the cutting tips, and obtains the separation by subtracting out the reference reading. This procedure can be automated by a variety of techniques. For example, the tool bits could have an electrical potential maintained therebetween and the tool holders advanced until a current is sensed, thereupon the advancement being terminated and the displacement gauge zeroed. Similarly, rather than bringing the tool bits into contact, they could be brought to a standard separation and thereafter this reference value used as the reference number for determining the separation of the tool bits. While such calibration can be done manually, it is preferred to have an automated calibration mechanism to reduce the dependance on operator skills.

The present invention also provides a method for using an on-car disk brake lathe to machine a brake disk having a first disk surface and a second disk surface while the disk is mounted to a wheel hub which in turn is rotatably mounted about a hub axis. When implemented with the improved brake lathe of the present invention, this method requires only a single displacement gauge for monitoring the lathe operation and reduces the training required of the operator. To practice the method, the on-car disk brake lathe, which has a lathe axis and a lathe frame, is affixed with respect to the hub and the lathe axis is aligned with the hub axis. The wheel hub is then driven by the lathe to rotate the disk about the hub axis.

As the disk is rotated, the tool holders of the lathe are radially positioned with respect to the brake disk such that the tool bits are preferably positioned over the outer extremity of the wear surfaces of the disk. To determine lateral run-out, the tool bits should be positioned near the maximum diameter of the disk surfaces; however, when the brake disk has been in service, the outermost region of the disk is frequently not subject to wear by brake pads, which results in a ridge. This ridge is nominally the outer ⅛" to ⅛" of the diameter of the disk. This region is also subject to corrosion, and thus is preferably machined away before such time as the thickness of the disk is measured. Thus, this ridged region of the disk should not be employed to determine the lateral runout or the thickness of the disk.

When the tool bits are positioned over the outer diameter of the wear surfaces, the first tool holder is moved to advance the first tool bit towards the first disk surface until the first tool bit makes continuous cutting contact with the first disk surface. Continuous contact can be directly observed by the operator by watching for the formation of a continuous machining chip, by listening for continuous sound of engagement of the tool bit with the disk, or by watching for the cutting of a continuous track. Similarly, the second tool holder is adjusted as described above with respect to the first tool holder to bring the second tool bit into continuous cutting contact with the second disk surface. When both tool bits are in continuous contact with their respective disk surfaces, advancement of the tool holders is ceased and the separation of the tool bits is measured. This measurement corresponds to the thickness of the brake disk which will result from machining. Such measurement can be readily made when the improved on-vehicle lathe of the present application is employed, since this separation will be directly obtainable from the displacement gauge.

If the operator has access to the minimum acceptable thickness as specified by the manufacturer, the measured thickness is preferably compared to the specified thickness. Only if the measured thickness is at least as great as the minimum acceptable thickness are the surfaces of the disk resurfaced by the tool bits. If the separation of the tool bits is less than the acceptable minium value, then the disk is discarded without further machining.

Even when the tool bits are positioned near the maximum radius of the disk surfaces, it may be advisable to increase each of the cuts taken by the tool bits by a predetermined amount below the depth that provides a continuous cut for the single ring path, both to assure that the lateral runout of the disk is corrected and to provide a smooth surface and reduce tool bit wear due to intermittent contact with the disk surface during machining. For a disk brake lathe employing the improved cutting head assembly which employs a single displacement gauge, this can be accomplished by monitoring the relative position of the first tool bit relative to the second tool bit and advancing one with respect to the other as one remains stationary. The amount of advancement for increasing the depth of cut equals the change in separation. To increase the depth of cut for the remaining tool bit, the new separation is recorded and thereafter this tool bit can then be advanced while the previously moved tool bit remains stationary. While such a procedure can be done, the predetermined cuts must be maintained sufficiently shallow as to avoid machining to a thickness less than the minimal acceptable thickness. This requires an additional check by the operator and adds one more step to the operator's processing of the brake disk.

The practice of the method set forth above, even when employing the improved brake disk lathe of the present application, is at best laborious and at worst subject to operator error. Making such a determination of whether to machine the disk surface manually requires a multi-step procedure where the operator must obtain the specification of thickness which is appropriate for the brake disk being machined, which requires either obtaining the specification data from a manual or some other database. The operator must also compare this value against a separation measured when both tools have been advanced to the position where they are both in continuous contact with their respective disk surfaces as the disk is rotated. The success of these steps is dependent on the skill of the operator and the attention given to executing these steps. Thus, it is preferred to provide an automated system for determining, prior to machining, whether the resulting thickness of the brake disk will meet the specification. For this reason, it is preferable to employ a system that shares the operational duties between the lathe, the lathe operator, a microprocessor, and control circuitry.

The system of the present invention has an on-vehicle brake lathe having a disk cutting assembly which includes tool holders which support disk-engaging tool bits. Means for monitoring the separation between the tool bits are also provided, preferably by a displacement gauge responsive to the separation between the tool holders. An operator control panel is provided which contains hardware and circuitry to allow the operator to position the tool bits with respect to the brake disk. A microprocessor communicating with the means for monitoring the separation between the tool bits is provided.

In an automated system, it is preferred to have at least one contact sensor, which is responsive to contact between at least one of the tool bits and another object, such as the other tool bit or the brake disk. At least one set of instructions responsive to the at least one contact sensor is provided to direct the position of the tool bits with respect to the brake disk. An operator interface is provided allowing the operator to input data and select instructions which regulate the functions performed by the at least one set of instructions.

The microprocessor is also preferably provided with an input/output interface which allows it to communicate either directly or indirectly with the operator. The input/output interface can also be employed to input standard specifications for the brake disk. These standard specifications for the disk brake as specified by the manufacturer can be read into the microprocessor in response to prompts from the operator interface. These specifications can be provided to the microprocessor by a variety of data transfer techniques, such as inputting the data via floppy disk, CD ROM, zip disk, on-line transfer keyboard, etc. Further discussion of means for inputting data is contained in the '427 patent noted above. The microprocessor can then be employed for comparing the tool bit separation, when both tool bits are in continuous cutting contact with the brake disk to the minimum standards which are provided by using an appropriate instruction set. This can be done before the tool bits are advanced across the disk surfaces. The microprocessor can also generate a comparison output signal. Depending on the output signal, a display is generated which indicates to the operator whether the tool bit separation falls within the brake standard specifications, at which point the operator is signaled to advance the tool bits across the disk surfaces to resurface the disk. Otherwise, the operator is signaled that the disk should be discarded, thereby eliminating any unnecessary machining of the disk to save operator time as well as wear on the tool bits.

It is further preferred that the means for monitoring the separation between the tool bits be provided by a displacement gauge which monitors the separation of the tool holders. When it such is the situation, the displacement gauge must be calibrated. To calibrate the gauge, the microprocessor can be provided with a series of instructions which result in the tool bits being brought into contact to determine a zero separation of the tool bits, at which point the advancement of the tool bits is stopped and the gauge output signal is zeroed or a base value established, and thereafter the tool bits are separated with the gauge reading the separation of the tool bits or the separation of the tool bits plus the base value. Alternative schemes can be employed, where the calibration is done by providing stops which are positioned such that, when engaged by the tool holders, the tool holders will be at a known separation from which the separation of the tool bits can be determined. In either case, these instructions can be manually implemented by the operator or, when the lathe is designed to be responsive to the microprocessor, these instructions can be performed under the direction of the microprocessor. In the latter case, one or more contact sensors are preferably employed to provide signals to indicate to the microprocessor when the tool bits are in contact with each other or are in either initial or continuous cutting contact with the disk surfaces.

When the system is designed to automatically determine when the tool bits are in continuous contact with the disk, the at least one contact sensor is a contact gauge which is capable of distinguishing between intermittent and continuous contact. Such gauges would include vibration, acoustic, and optical gauges. When the tool bits are advanced individually, a single contact gauge can be used sequentially for each tool bit as it is advanced to determine when initial contact and continuous cutting contact have been achieved. However, for simplicity of the instrumentation to distinguish between continuous contact for the separate tool bits, it is preferred to provide a first contact gauge to monitor the first tool bit and a second contact gauge to monitor the second tool bit.

When it is further desired for the system to have the capacity to measure the lateral run-out of the disk without contacting the disk with the tool bits, such can be done by providing a surface displacement gauge positioned such that it will be responsive to variation in the distance to the disk. Preferably, the surface displacement gauge is mounted to one of the tool holders so as to engage the disk at approximately the same radius as the tool bits, and monitors the separation between the tool holder and the disk surface when the holder is fixed in position. Circuitry is provided such that the surface displacement gauge reports distances only when the gauge is stationary. In this way, the lateral run-out can be determined from separation data provided by the surface displacement gauge. To assure that the surface displacement gauge is within its range, it is further preferred for a proximity sensor to be provided to verify that the position of the tool holder is such that the distance from the surface displacement gauge to the disk surface being measured remains within the range of the gauge as the disk is rotated.

The above described system can be programmed to provide alternate functions. For example, the above described system can be programmed such that, when an independent determination has previously been made of the thickness and lateral runout of the disk, an alternative method for machining the brake disk may be employed. This is frequently the case when the disk has been previously tested to determine whether machining is necessary. When such is the situation, the tool bits need not be brought into continuous cutting contact with the disk after mounting the lathe and positioning the tool bits about the disk. However, at least one reference point must be established, which can be done by bringing one of the tool bits into initial contact with the disk as the wheel hub and disk are rotated. With this reference point established and with the lateral runout information obtained from prior testing, it is determined how deep the cut on each surface of the disk will need to be to correct such lateral run-out. The sum of the depth of both cuts can be subtracted from the sum of the previously determined thickness and the lateral runout to provide a calculated resulting thickness, and this value can be compared to the manufacturer's specification. If the calculated resulting thickness is sufficient, then the tool bits can be positioned with respect to the reference point to set the desired depths of cut and thereafter advanced across the disk surfaces to remove the sufficient material to bring the brake disk into specification.

When it is desired to have the lathe resurface the disk surfaces from the outer region of the disk surfaces to the interior region, a proximity sensor can be employed to assure that the inward advance of the tool bits is stopped prior to contact with the wheel hub of the vehicle. Additional proximity sensors can be employed which can prevent accidental collision between the tool holders or tool bits and the disk or other fixed parts of the vehicle as the tool bits are positioned. Such additional proximity sensors can be particularly important when the system is automated and thus not subject to intervention by the operator.

BEST MODE OF CARRYING THE INVENTION INTO PRACTICE

Figure 1:
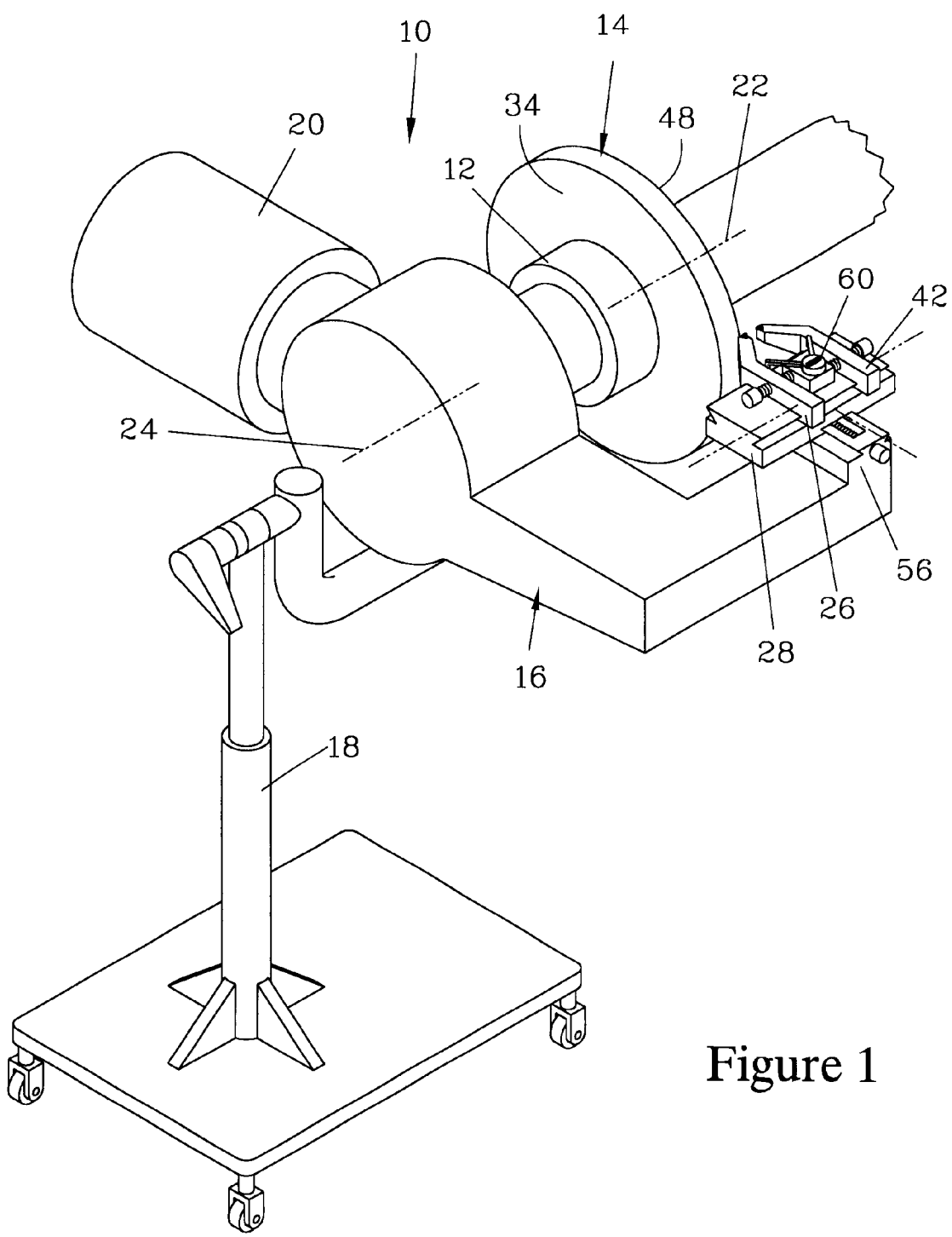
FIG. 1 is an isometric view of an improved on-vehicle disk brake lathe of the present invention which employs a two-part frame with a platform movably mounted to a base. In this embodiment, the platform can be translated to move the tool bits across a brake disk which is being resurfaced.

FIG. 1 is an isometric view of one embodiment of the improved on-vehicle disk brake lathe 10 of the present invention, hereinafter referred to as disk brake lathe 10. The disk brake lathe 10 attaches to a wheel hub 12 which in turn has a brake disk 14 fixably attached with respect thereto. The disk brake lathe 10 has a frame 16 which is mounted with respect to a vehicle (not shown) on which the wheel hub 12 is rotatably mounted. The frame 16 is supported by the attachment of the disk brake lathe 10 to the wheel hub 12. To prevent rotation of the disk brake lathe 10, the lathe frame 16 can be additionally supported by attachment to the vehicle or can be mounted with respect thereto via a floor stand 18. A motor 20 attached to the frame 16 rotates the wheel hub 12 and the brake disk 14 about a hub axis 22.

The disk brake lathe 10 has a lathe axis 24 which is aligned with the hub axis 22 when the disk brake lathe 10 is operated. Means to align the hub axis 22 with the lathe axis 24 are discussed and equipment to automate the alignment procedure is set forth in U.S. Pat. Nos. 5,974,878 and 6,050,160, and application Ser. No. 09/182,429, which are assigned to the assignee of the present application.

Figure 2:
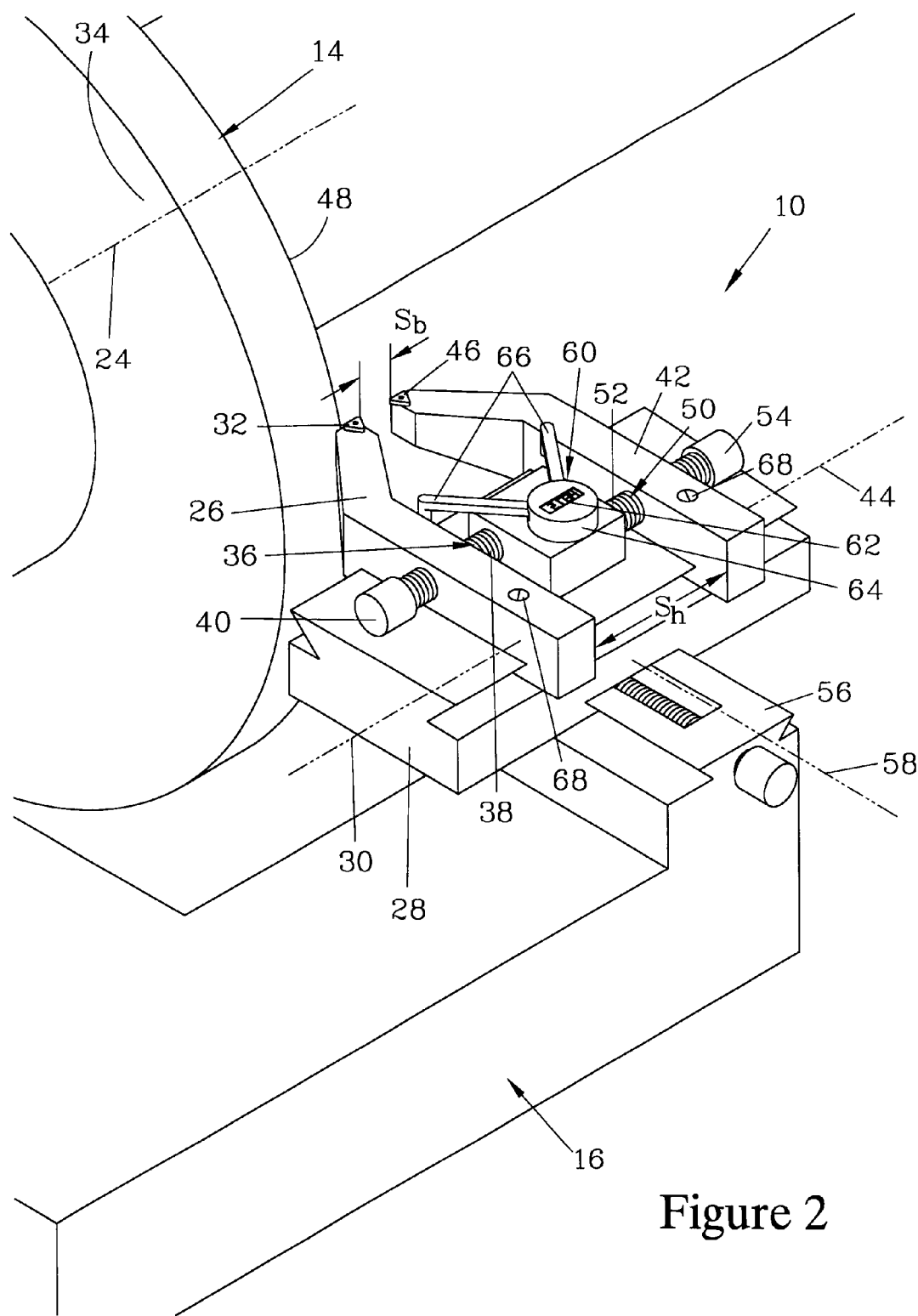
FIG. 2 is a detail view showing a cutting tool assembly including the tool bits and related structure of the embodiment shown in FIG. 1.

As shown in FIG. 2, the disk brake lathe 10 has a first tool holder 26 which slidably engages a platform 28 of the frame 16 and traverses a first tool holder path 30 which is parallel to the lathe axis 24. A first tool bit 32 is attached to the first tool holder 26 and is employed to resurface a first disk surface 34. A first holder threaded shaft 36 terminates in a first shaft end 38 and a first knob 40. The first shaft end 38 is rotatably mounted to the platform 28, and the first holder threaded shaft 36 threadably engages the first tool holder 26. Turning the first knob 40 adjusts the normal component of a spatial separation of the first tool bit 32 with respect to the first disk surface 34 of the brake disk 14.

Similarly, the disk brake lathe 10 has a second tool holder 42 which slidably engages the platform 28 and traverses a second tool holder path 44 which is parallel to the lathe axis 24. A second tool bit 46 which is attached to the second tool holder 42 is employed to resurface a second disk surface 48. A second holder threaded shaft 50 terminates in a second shaft end 52 and a second knob 54. The second holder threaded shaft 50 is rotatably mounted to the platform 28, and the second holder threaded shaft 50 threadably engages the second tool holder 42. Turning the second knob 54 independently adjusts the normal component of a spatial separation of the second tool bit 46 with respect to the second disk surface 48 of the brake disk 14.

The frame 16 has a base 56 to which the platform 28 is translatably mounted. The platform 28 is movable along a feed path 58 which is normal to the lathe axis 24. When the separation between the first tool bit 32 and a plane containing the first disk surface 34 and/or the spatial separation between the second tool bit 46 and a plane containing the second disk surface 48 are negative, the tool bits (32, 46) can be advanced into machining engagement so as to resurface the disk surfaces (34, 48).

A displacement gauge 60 is positioned such that it measures the separation $S_h$ between the first tool holder 26 and the second tool holder 42. Since the separation $S_h$ varies directly as the separation $S_b$ of the tool bits (32, 46), by calibrating the displacement gauge 60 such that it has a base value when the tool bits (32, 46) are in contact with each other, the separation $S_b$ of the tool bits (32, 46) can be readily monitored. A variety of gauges are suitable for this purpose. These gauges can have either digital or analog output and may or may not be integrated with other elements such that they are capable of providing a direct reading of the separation $S_b$ of the tool bits (32, 46). The displacement gauge 60 illustrated has a self-contained display 62 which, in this embodiment of the invention, serves as means for outputting the signal from the displacement gauge 60. The displacement gauge 60 is preferably calibrated such that, when the tool bits (32, 46) are in contact with each other, the reading of the displacement gauge 60 is set to zero and this separation is shown on the display 62. The displacement gauge 60 in this embodiment is a rotary displacement gauge having a gauge body 64, which is mounted to the platform 28, and sensing elements 66 which engage the tool holders (26, 42). A more extensive treatment of gauge technology is found in U.S. Pat. No. 5,970,427, which is assigned to the assignee of the present application.

As the tool bits (32, 46) traverse the disk surfaces (34, 48), a force normal to the disk surfaces (34, 48) is generated which must be balanced by a reaction force to avoid displacement of the tool bits (32, 46). The frictional forces associated with the respective threadable engagement of the threaded shafts (36, 50) with the tool holders (26, 42) are usually sufficient to maintain the tool bits (32, 46) in position. However, in cases where these frictional forces are not sufficient, then supplemental securing means for holding the tool holders (26, 42) in a fixed axial position relative to the frame 16 such as set screws 68 can be provided to serve as locks which prevent movement of the tool bits (32, 46) parallel to the tool holder paths (30, 44) when the brake disk 14 is being resurfaced by the tool bits (32, 46). In a more automated lathe, locks which are activated by solenoids or electromechanical means are better suited for securing the tool holders than manually activated locks.

Figure 3:
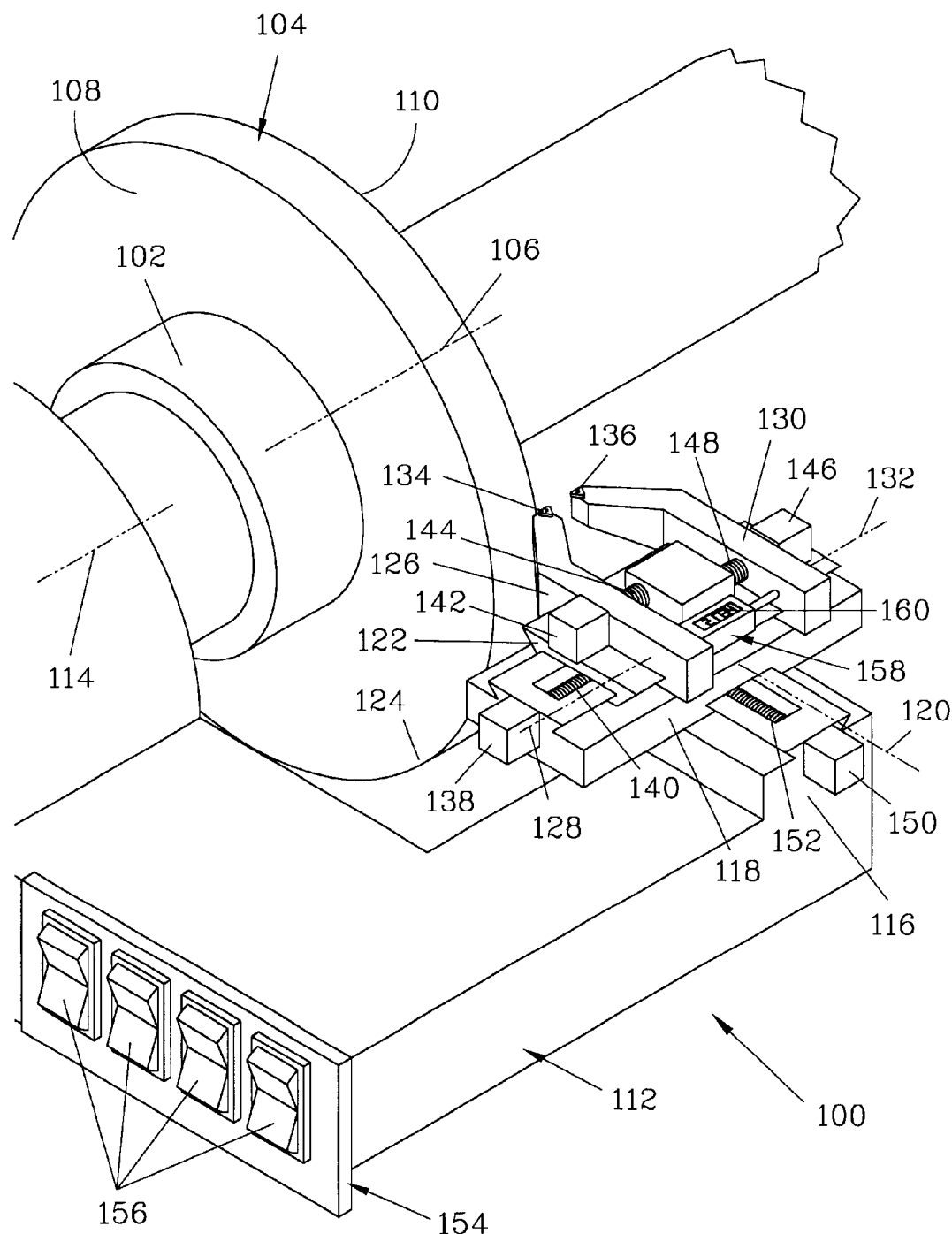
FIG. 3 is a partial isometric view of a cutting tool assembly for another on-vehicle disk brake lathe of the present invention. In this embodiment, the disk brake lathe employs a three-part frame having a base which, when the lathe is operated, is fixed with respect to the hub axis. Onto the base is mounted a platform which translates normal to the hub axis, and mounted thereon is a support plate which translates parallel to the hub axis. The support plate has slidably engaged therewith tool holders which in turn have tool bits mounted thereon. The support plate allows pairwise movement of the tool bits for coarse positioning of the tool bits with respect to the brake disk.

FIG. 3 is a partial isometric depiction of another embodiment of the present invention, a disk brake lathe 100 which is designed to provide more automated operation than the embodiment illustrated in FIG. 1. Again, the disk brake lathe 100 attaches to a wheel hub 102 which in turn has a brake disk 104 affixed with respect thereto, both of which are symmetrically disposed about a hub axis 106. The brake disk 104 has a first disk surface 108 and a second disk surface 110 which are the surfaces that are gripped by the brake pads (not shown) when the brakes are applied.

The disk brake lathe 100 has a multi-part frame 112. The frame 112 is fixably mounted with respect to the vehicle on which the brake disk 104 being serviced is mounted. The disk brake lathe 100 has a lathe axis 114 which is aligned with the hub axis 106 before the disk brake lathe 100 is employed to resurface the brake disk 104.

In this embodiment, the frame 112 has a base 116 which is fixable with respect to the hub axis 106. A platform 118 slidably engages the base 116 and traverses a feed path 120 that is normal to the hub axis 106. A support plate 122 in turn slidably engages the platform 118 and traverses a support plate path 124 which is parallel to the lathe axis 114.

A first tool holder 126 slidably engages the support plate 122 and traverses a first tool holder path 128 which is parallel to the hub axis 106. Similarly, a second tool holder 130 slidably engages the support plate 122 and traverses a second tool holder path 132 which is parallel to the hub axis 106.

A first tool bit 134 is attached to the first tool holder 126 and positioned such that it can be engaged with the first disk surface 108 of the brake disk 104. A second tool bit 136 is attached to the second tool holder 130 and positioned such that it can be engaged with the second disk surface 110 of the brake disk 104.

A support plate drive servo 138 is attached to the platform 118 and drives a threaded platform shaft 140 when the support plate drive servo 138 is energized. The threaded platform shaft 140 threadably engages the support plate 122 and provides pairwise adjustment of the position of the first tool holder 126 and the second tool holder 130, thereby allowing coarse adjustment of the tool bits (134, 136) with respect to the brake disk 104.

A first tool holder servo 142 is attached to the first tool holder 126 and drives a threaded first holder advancing shaft 144, which threadably engages the support plate 122. When activated, the first tool holder servo 142 provides adjustment of the normal component of the spatial separation between the first tool bit 134 and the first disk surface 108. Similarly, a second tool holder servo 146 is attached to the second tool holder 130 and drives a threaded second holder advancing shaft 148 which threadably engages the support plate 122. The second tool holder servo 146, when activated, provides adjustment of the normal component of the spatial separation between the second tool bit 136 and the second disk surface 110.

A feed servo 150 is attached to the base 116 and drives a threaded feed shaft 152 which threadably engages the platform 118. As the feed servo 150 is activated, the platform 118 is either advanced toward or retracted away from the brake disk 104. When the tool bits (134, 136) are advanced such that the respective normal spatial separations between the tool bits (134, 136) and the disk surfaces (108, 110) are negative, the tool bits (134, 136) cut the disk surfaces (108, 110) as they pass over the brake disk 104 and provide new disk surfaces (108, 110).

While the embodiment shown in FIG. 3 employs servos (138, 142, 146, 150) and threaded shafts (140, 144, 148, 152) as means for imparting motion to the selected elements, clearly other means could be employed, such as rack-and-pinion mechanisms, stepping motors, and linear actuators such as hydraulic cylinders.

When servos are employed to impart the motions discussed above, such can be directionally activated by employing reversing polarity switches with a central neutral position to control both activation and direction of the servos. A control panel 154 is provided for mounting four switches 156, each of which have an open position and a pair of closed positions of opposite polarity. These switches 156 control the servos (138, 142, 146, 150) employed in this embodiment.

Again, for this embodiment a displacement gauge 158 with a display 160 is provided to measure the distance between the first tool holder 126 and the second tool holder 130. When the displacement gauge 158 has been calibrated such that it reads zero when the tool bits (134, 136) are in contact with each other, then when the tool bits (134, 136) are in continuous cutting contact with the surfaces (108, 110) of the brake disk 104, the reading on the displacement gauge 158 equals the thickness of the brake disk 104 which will result after resurfacing. This thickness can be determined before the brake disk 104 is resurfaced, and at this time the reading of the displacement gauge 158 can be checked against the manufacturer's specifications to determine whether the machined brake disk 104 will meet the specifications. If the reading of the displacement gauge 158 is less than the accepted minimum thickness specification for the brake disk 104, the brake disk 104 can be discarded by the operator before machining the surfaces (108, 110), thereby saving both operator time and wear on the tool bits (134, 136). Furthermore, any error introduced by wear of the tool bits (134, 136) will tend to underestimate the thickness of the brake disk 104, thus assuring that the brake disk 104 will not inadvertently be machined to a thickness under the specified minimum thickness set by the manufacturer.

Figure 4:
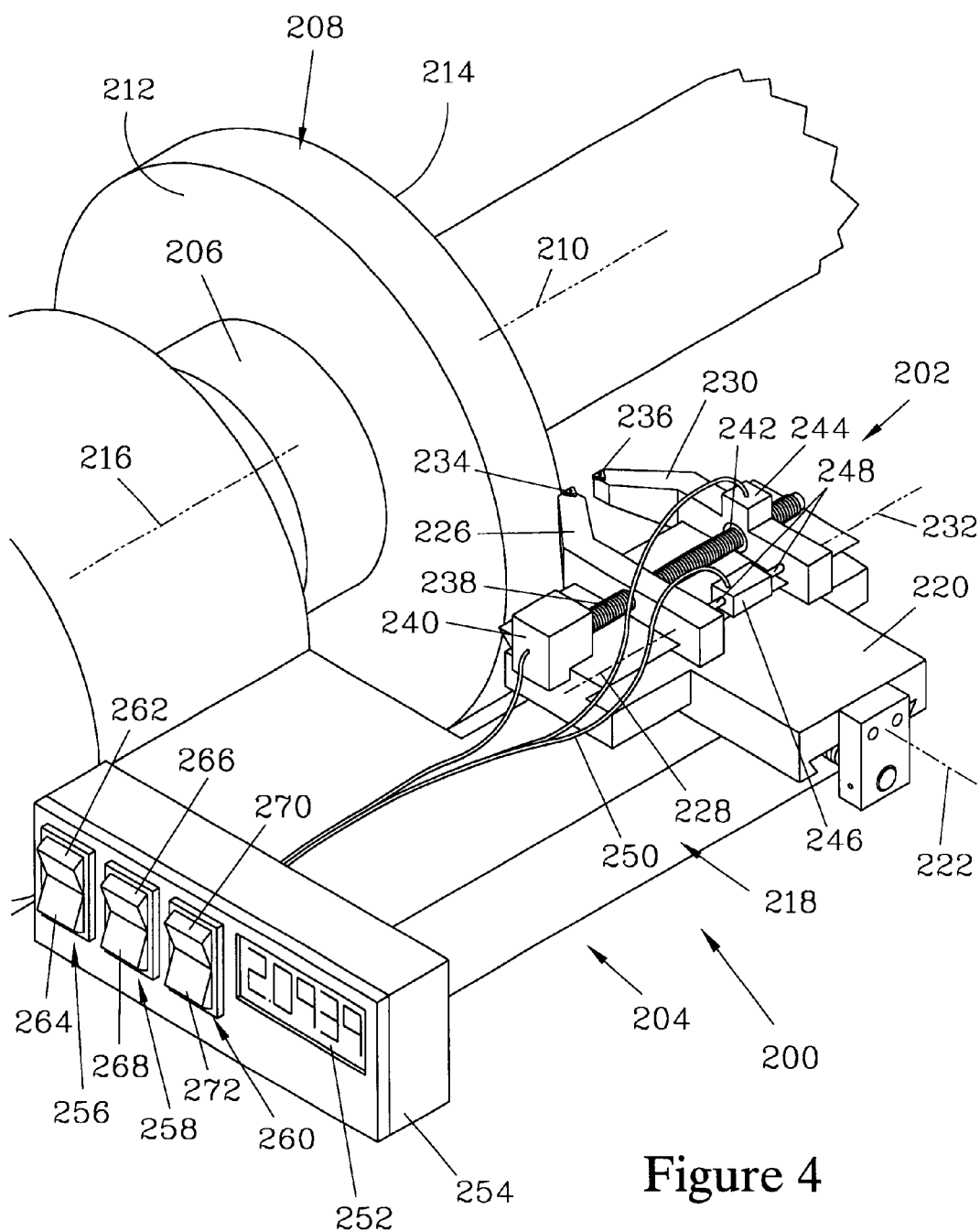
FIG. 4 is a partial isometric view of another on-vehicle disk brake lathe of the present invention, which can be formed by retrofitting a cutting tool assembly onto an existing brake lathe. This embodiment employs a two-part frame where tool holders are directly slidably mounted to a platform which in turn is mounted to a tool assembly receptor. A threaded shaft in combination with a driven nut on one of the tool holders provide both pairwise and individual adjustment of the positions of the tool holders.

FIG. 4 is a partial isometric view of a disk brake lathe 200 which has a modular cutting tool assembly 202 which is configured to be retrofittable onto a commercially available disk brake lathe such as the currently available PFM 900 on-vehicle disk brake lathe produced by Pro-Cut International, LLC. The resulting disk brake lathe 200 has a lathe base assembly 204 which attaches to a wheel hub 206 that in turn has a brake disk 208 affixed thereto. Both the brake disk 208 and the wheel hub 206 are symmetrically disposed about a hub axis 210. The brake disk 208 in turn is bounded by a first disk surface 212 and a second disk surface 214.

The lathe base assembly 204 is fixably mounted with respect to a vehicle on which the brake disk 208 and its wheel hub 206 are mounted. The lathe base assembly 204 has a lathe axis 216, and a base element 218 which attaches to the hub 206 and terminates in a slidably attached tool assembly platform 220. When the base element 218 is attached to the wheel hub 206 and aligned for turning the brake disk 208, the lathe axis 216 is substantially coincident with the hub axis 210. When the axes (210, 216) are so aligned, the tool assembly platform 220 traverses a feed path 222 which is normal to the hub axis 210. The tool assembly platform 220 is driven by a gear train (not shown) which in turn can be engaged with and driven by the motor (not shown) which drives the wheel hub 206.

A first tool holder 226 slidably engages the tool assembly platform 220 such that the first tool holder 226 traverses a first tool holder path 228 which is parallel to the lath axis 216. Similarly, a second tool holder 230 slidably engages the tool assembly platform 220 and traverses a second tool holder path 232 which is parallel to the lathe axis 216. A first tool bit 234 is mounted on the first tool holder 226 while a second tool bit 236 is mounted on the second tool holder 230. These tool bits (234, 236) are positioned on the tool holders (226, 230) such that, by positioning the tool assembly platform 220 and the tool holders (226, 230) along selected segments of their respective paths (222, 228, 232), the tool bits (234, 236) can be positioned to engage the disk surfaces (212, 214).

The tool holders (226, 230) are slidably positionable along the paths (228, 232) through the cooperative actions of a threaded shaft 238, a shaft servo 240, and a driven nut 242. The shaft servo 240 is mounted on the tool assembly platform 220 and drives the threaded shaft 238, which in turn threadably engages the first tool holder 226. The threaded shaft 238 also threadably engages the driven nut 242, which is mounted in the second tool holder 230. A nut driver 244 which drives the driven nut 242 is also mounted to the second tool holder 230.

A displacement gauge 246 is attached to the tool assembly platform 220 and measures the relative separation between the tool holders (226, 230). The displacement gauge 246 has sensing tips 248 which engage the tool holders (226, 230) and are displaced by the relative movement of the tool holders (226, 230). The displacement gauge 246 is calibrated to generate signals in response to such displacement that are proportional to the separation of the tool bits (234, 236). The signals are transmitted via a connecting cable 250 to a display 252 which converts the signal and displays the separation of the tool bits (234, 236).

The display 252 in turn is mounted in a control box 254 which is readably accessible to the operator and may be either free standing or attached to the disk brake lathe 200 at a location convenient to the operator. The control box 254 also has mounted thereon a first tool holder switch 256, a second tool holder switch 258, and a dual tool holder switch 260. Each of these switches (256, 258, 260) is biased to an open position and can be toggled to one of two positions which operate circuitry contained in the control box 254 which appropriately activates the shaft servo 240 and/or the nut driver 244 to generate the desired translations of the tool holders (226, 230).

The first tool holder switch 256 has an upper switch pad 262 and a lower switch pad 264. When the upper switch pad 262 is depressed, the shaft servo 240 is activated so as to turn the threaded shaft 238 such that the first tool holder 226 moves away from the shaft servo 240, while the nut driver 244 is activated such that the driven nut 242 rotates to counteract rotation of the threaded shaft 238 such that the second tool holder 230 remains stationary. When the lower switch pad 264 is depressed, the direction of rotation of the threaded shaft 238 and the driven nut 242 are reversed, causing the first tool holder 226 to move toward the shaft servo 240 while the second tool holder 230 remains stationary.

To independently activate the second tool holder 230, the second tool holder switch 258 is employed. The second tool holder switch 258 has an upper pad 266 and a lower pad 268. When the upper pad 266 is depressed, it activates circuitry which activates the nut driver 244 so as to turn the driven nut 242 in a direction which moves the second tool holder 230 away from the first tool holder 226. When the lower pad 268 is depressed, the nut driver 244 turns the driven nut 242 so as to advance the second tool holder 230 towards the first tool holder 226.

To move the tool holders (226, 230) in a pair-wise manner, the dual tool holder switch 260 is employed, which has an upper pad 270 and a lower pad 272. When the upper pad 270 is depressed, it activates circuitry which activates the shaft servo 240 to drive the threaded shaft 238 so as to pairwise advance both the tool holders (226, 230) away from the shaft servo 240, while the driven nut 242 remains stationary with respect to the second tool holder 230. Alternatively, when the lower pad 272 is depressed, the threaded shaft 238 turns to advance the tool holders (226, 230) towards the shaft servo 240.

Figure 5:
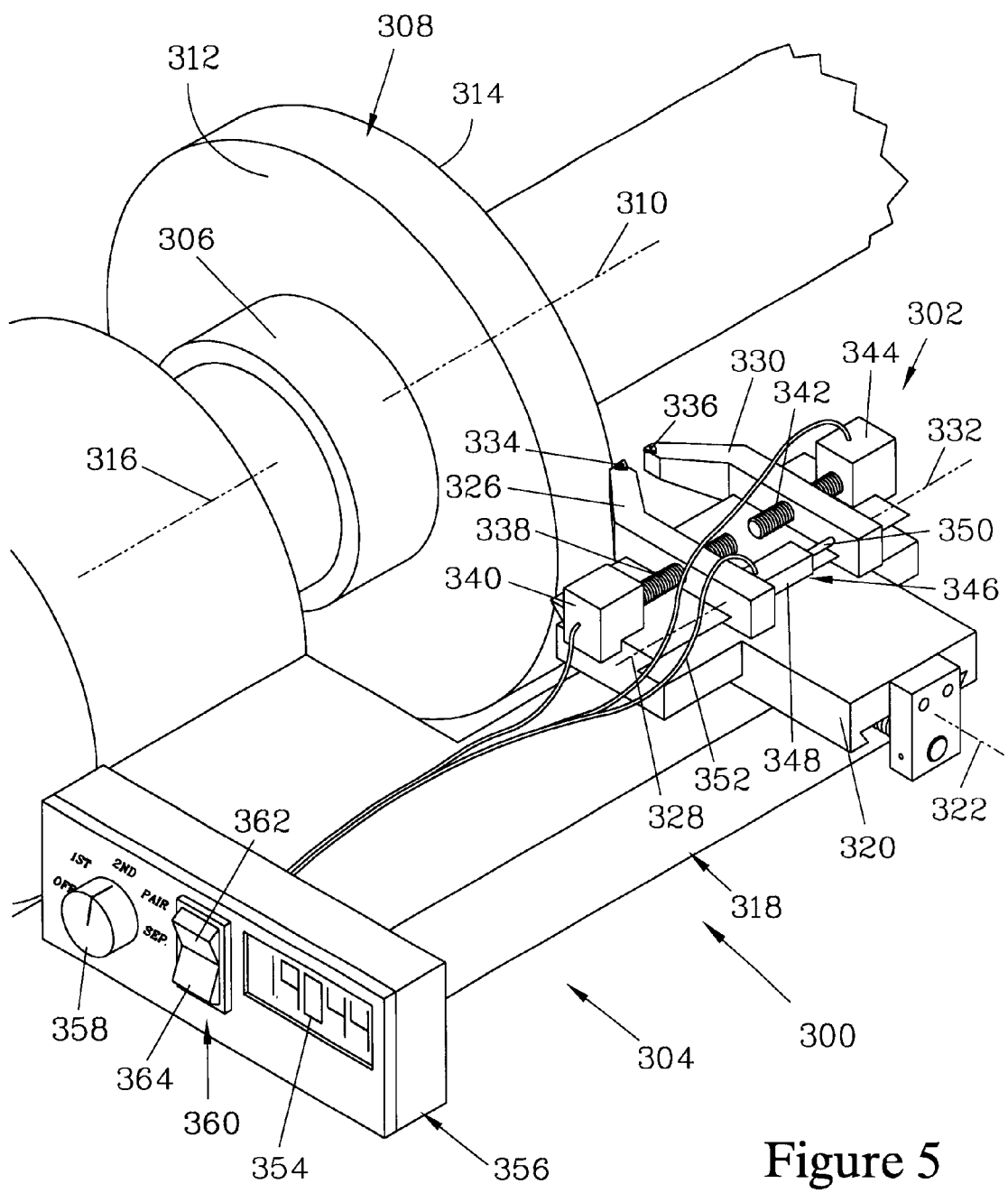
FIG. 5 is a partial isometric view of another on-vehicle disk brake lathe of the present invention which can be formed by retrofitting, and which employs a two-part frame. Again, tool holders are directly slidably mounted to a platform which in turn is mounted to a tool assembly receptor, and the tool holders in this embodiment are each moved by threaded shafts.

FIG. 5 is a partial isometric view of another embodiment of the present invention which provides an alternative scheme for adjusting the position of the tool bits. A disk brake lathe 300 can again be formed by retrofitting a commercially available disk brake lathe with an alternative modular cutting tool assembly 302. The disk brake lathe 300 has a lathe base assembly 304 which attaches to a wheel hub 306 having a brake disk 308 affixed thereto, with both the brake disk 308 and the wheel hub 306 being rotatable about a hub axis 310. The brake disk 308 is bounded by a first disk surface 312 and a second disk surface 314.

Again, the lathe base assembly 304 has a lathe axis 316, and a frame 318 which attaches to the wheel hub 306 and terminates in a slidably attached tool assembly platform 320. When the frame 318 is attached to the wheel hub 306 and aligned for turning the brake disk 308, the lathe axis 316 is substantially coincident with the hub axis 310. When the axes (310, 316) are so aligned, the tool assembly platform 320 traverses a feed path 322 which is normal to the hub axis 310, and can again be driven by a gear train (not shown).

A first tool holder 326 slidably engages the tool assembly platform 320 so as to be movable along a first tool holder path 328 which is parallel to the lath axis 316. Similarly, a second tool holder 330 slidably engages the tool assembly platform 320 so as to be movable along a second tool holder path 332, which is parallel to the lathe axis 316. A first tool bit 334 is mounted on the first tool holder 326 and a second tool bit 336 is mounted on the second tool holder 330. The tool bits (334, 336) are positioned on the tool holders (326, 330) such that they can be positioned to engage the disk surfaces (312, 314) by positioning the tool assembly platform 320 and the tool holders (326, 330) along selected segments of their respective paths (322, 328, 332).

The first tool holder 326 is positionable along the first tool holder path 328 through the action of a first threaded shaft 338. The first threaded shaft 338 is selectively rotated by a first shaft servo 340 which is mounted on the tool assembly platform 320. The first threaded shaft 338 threadably engages the first tool holder 326 so as to move the first tool holder 326 along the first tool holder path 328 as the first threaded shaft 338 rotates. Similarly, the second tool holder 330 is positionable along the second tool holder path 332 through the action of a second threaded shaft 342 which is driven by a second shaft servo 344. The second shaft servo 344 is mounted on the tool assembly platform 320 and selectively rotates the second threaded shaft 342, which in turn threadably engages the second tool holder 330. Again, while in this embodiment threaded shafts and servos are employed as means for moving the tool holders, it should be appreciated that other means could be readily substituted by one skilled in the art. Such means could include rack and pinion mechanisms, pneumatic activators, hydraulic activators, etc.

A displacement gauge 346 is provided, having a gauge body 348 and a gauge sensing element 350. In this embodiment, the gauge body 348 is mounted to the first tool holder 326, and the gauge sensing element 350 engages the second tool holder 330. The gauge sensing element 350 is displaced relative to the gauge body 348 by the movement of the tool holders (326, 330). The displacement gauge 346 generates signals in response to such displacement that are proportional to the separation of the tool bits (334, 336). The displacement gauge 346 could be calibrated either by moving the tool holders (326, 330) together until the tool bits (334, 336) are in contact with each other, resulting in a separation of zero, or, alternatively, by moving the tool holders (326, 336) until each is engaged with its associated servo (340, 344) to provide a reference separation between the tool bits (332, 334). It should be noted that other gauge configurations capable of responding to relative displacement between the tool holders, such as the displacement gauges disclosed in the '427 patent, could be substituted.

The signals from the displacement gauge 346 are transmitted via a connecting cable 352 to a display 354 which converts the signal and displays the separation of the tool bits (334, 336). The display 354 is mounted in a control box 356 which is positioned so as to be readily accessible to the operator. The control box 356 also has mounted thereon controls for allowing an operator to control the motion of the tool holders (326, 330). In this embodiment, the control box 356 has a mode selector switch 358 and a dual-position switch 360 which can be toggled between two closed positions of opposite polarity and is biased to an open position therebetween.

The mode selector switch 358 is a rotary switch which can be set to one of five positions to select the desired operation of the shaft servos (340, 344) in response to the dual-position switch 360. The mode selector switch 358 has an "OFF" position, a "1ST TOOL" position, a "2ND TOOL" position, a "PAIR" position, and a "SEPARATION" position. Moving the mode ia selector switch to its "OFF" position stops transmission of power to the dual-position switch 360 and the display 354.

When the mode selector switch 358 is turned to its "1ST TOOL" position, the dual-position switch 360 controls the action of only the first shaft servo 340. The dual-position switch 360 has an upper switch pad 362 and a lower switch pad 364. In this mode, when the upper switch pad 362 is depressed, the first shaft servo 340 is activated so as to turn the first threaded shaft 338 such that the first tool holder 326 moves away from the first shaft servo 340. When the lower switch pad 364 is depressed, the direction of rotation of the first threaded shaft 338 is reversed, causing the first tool holder 326 to move toward the first shaft servo 340. While the dual-position switch 360 illustrated is a two-pole switch, a variable rate switch could be employed as the dual-position switch 360 to allow the operator to control the speed of the motion by varying the pressure with which the pad (362 or 364) is depressed.

When the mode selector switch 358 is turned to its "2ND TOOL" position, the dual-position switch 360 controls the action of only the second shaft servo 344. In this mode, when the upper switch pad 362 is depressed, the second shaft servo 344 is activated so as to turn the second threaded shaft 342 such that the second tool holder 330 moves away from the second shaft servo 344. When the lower switch pad 364 is depressed, the direction of rotation of the second threaded shaft 342 is reversed, causing the second tool holder 330 to move toward the second shaft servo 344.

When the mode selector switch 358 is turned to its "PAIR" position, the dual-position switch 360 controls the action of both the first shaft servo 340 and the second shaft servo 344 to move the first tool holder 326 and the second tool holder 330 in a synchronous manner. In this mode, when the upper switch pad 362 is depressed, the first shaft servo 340 is activated to turn the first threaded shaft 338 such that the first tool holder 326 moves away from the first shaft servo 340, while the second shaft servo 344 is activated so as to turn the second threaded shaft 342 such that the second tool holder 330 moves towards the second shaft servo 344. When the lower switch pad 364 is depressed, the direction of rotation of both threaded shafts (338, 342) is reversed, causing the first tool holder 326 to move toward the first shaft servo 340 and the second tool holder 330 to move away from the second shaft servo 344. Thus, in this mode the tool holders (326, 330) are moved along their respective paths (328, 332) in coordination to provide coarse positioning of the tool bits (334, 336) with respect to the brake disk 308.

When the mode selector switch 358 is turned to its "SEPARATION" position, the dual-position switch 360 again controls the action of both the first shaft servo 340 and the second shaft servo 344. However, in this mode the dual-position switch 360 causes the first tool holder 326 and the second tool holder 330 to move in an opposed manner. In this mode, when the upper switch pad 362 is depressed, the first shaft servo 340 turns the first threaded shaft 338 such that the first tool holder 326 moves away from the first shaft servo 340, and the second shaft servo 344 turns the second threaded shaft 342 such that the second tool holder 330 moves away from the second shaft servo 344. When the lower switch pad 364 is depressed, the direction of rotation of both threaded shafts (338, 342) is again reversed, causing the first tool holder 326 to move toward the first shaft servo 340 and the second tool holder 330 to move toward the second shaft servo 344. Thus, in this mode the tool holders (326, 330) are moved along their respective paths (328, 332) in opposition to provide coarse adjustment of the separation between the tool bits (334, 336).

While this embodiment employs the mode selector switch 358 in combination with the dual-position switch 360 to control the motion of the servos, it should be appreciated by one skilled in the art that similar control could be achieved by various switch configurations. One such configuration would be to employ four dual-position switches, one for each mode of operation.

Figure 6:
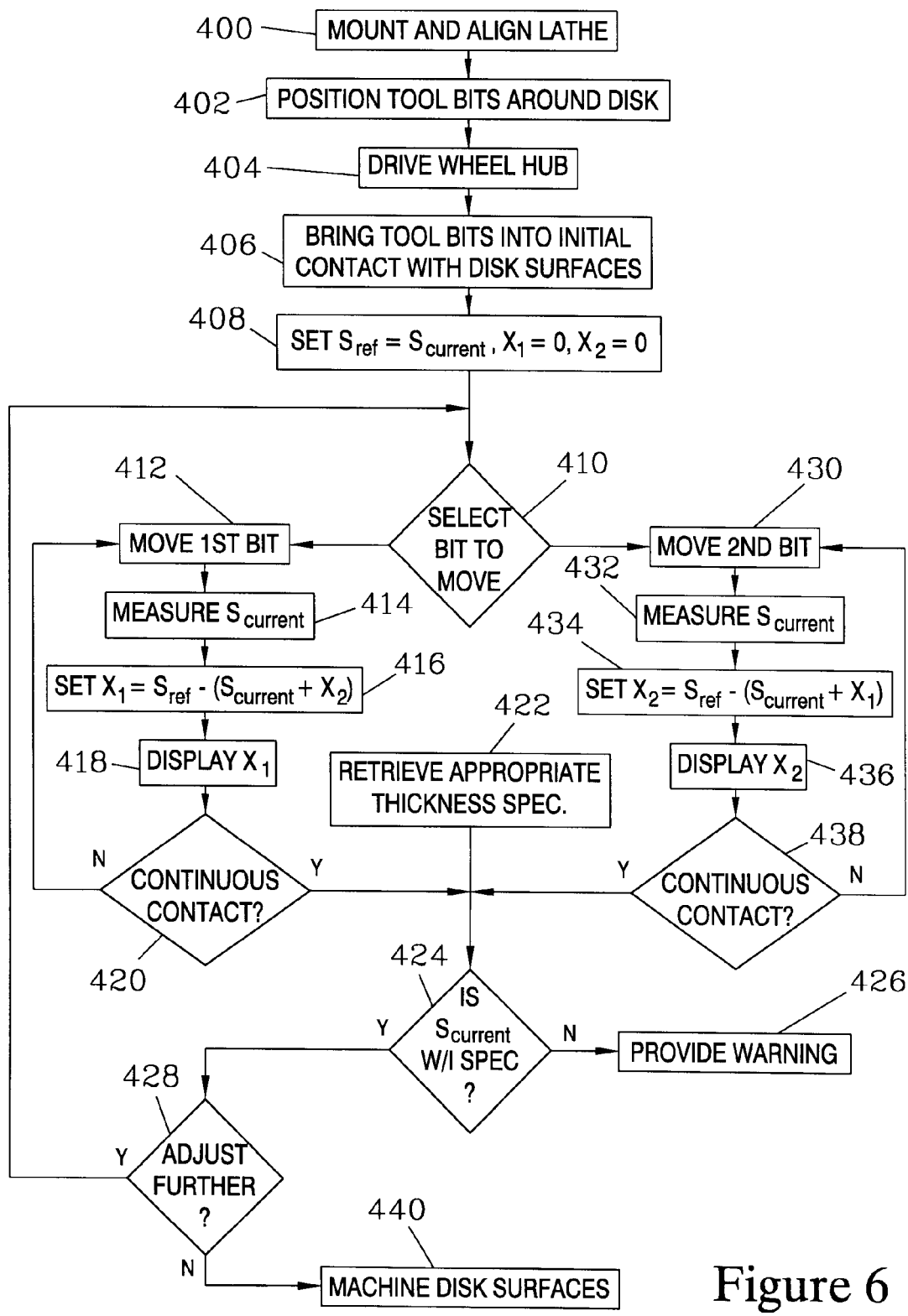
FIG. 6 is a flow diagram illustrating steps for practicing the method of the present invention.

The use of the brake lathe of the present invention results in a brake lathe operator taking certain steps which form a method of inspection and resurfacing that has utility beyond the particulars of the devices discussed above. When the method is practiced, a systematic series of steps is provided, with checks that lead the lathe operator to the appropriate step to be taken with the brake disk in view of its current condition. FIG. 6 is a flow diagram illustrating a series of preferred steps for practicing this method.

In practicing the method, an on-vehicle disk brake lathe having a pair of tool bits and a brake lathe axis is mounted to a wheel hub of a wheel assembly of a vehicle, and the brake lathe axis is the aligned with the hub axis, as indicated in step 400. The alignment can be done manually, based on the observations and experience of the operator, or can be automated with an automated lathe such as described in U.S. Pat. Nos. 5,974,878 and 6,050,160 and application Ser. No. 09/182,429. After the brake lathe is attached to the wheel hub and aligned, the tool bits of the lathe are positioned such that the brake disk lies therebetween as indicated in step 402. Once the disk brake lathe has been mounted and aligned, the disk brake lathe is energized to turn the hub and the attached brake disk as indicated in step 404.

As the wheel assembly spins with the brake disk rotating between the tool bits, they are advanced toward the brake disk until each of the tool bits is brought into initial engaging contact with its respective disk surface in step 406. The tool bits can either be sequentially advanced or can be advanced in a pairwise manner. When the method is being performed under the direct control of the lathe operator without instrumentation, it is preferred that the tool bits be sequentially advanced. Such a sequence allows the operator to make an independent determination as to when contact for each tool bit is achieved, either by visual observation of a chip being formed or by acoustic emissions resulting from the contact of the brake disk by the tool bit. In any case, the advancement of each of the tool bits is stopped when contact between each tool bit and its associated disk surface is achieved. At this time, as indicated by step 408, the current value of the separation $S_{current}$ between the tool bits is measured and this value is set as a reference separation $S_{ref}$. A first depth of cut value $X_1$ and a second depth of cut value $X_2$ are both set at zero. Frequently, it is desirable to display the current values of the first depth of cut $X_1$ and the second depth of cut $X_2$ at this time and throughout the adjustment process; however, in the illustrated method, the display of these values is not addressed until after the corresponding tool bit has been moved.

In step 410, one of the tool bits is selected to be moved. If the first tool bit is selected, it is moved to adjust the first depth of cut in step 412. As the first tool bit is moved, the separation $S_{current}$ between the tool bits is monitored in step 414, and in step 416 the first depth of cut $X_1$ is reset to the difference between the reference separation $S_{ref}$ and the sum of the current separation $S_{current}$ and the second depth of cut value $X_2$.

$$X_1 = S_{ref} - (S_{current} + X_2) \qquad \text{(Equation 1)}$$

The value of the first depth of cut $X_1$ is displayed to the operator in step 418.

A determination is made in step 420 whether the first tool bit is in continuous engaging contact with the associated disk surface. Such a determination as to when continuous contact for the first tool bit is achieved can be made either by visual observation of the chip being formed or by observing the change in character of the acoustic or vibratory emissions resulting from the cutting of the brake disk by the tool bits. Another identifier of when a tool bit is in continuous contact with the brake disk is provided when a continuous furrow is formed, which can be visually observed. Similarly, when the chip becomes continuous, the acoustic emissions resulting from chip formation become continuous and no longer produce intermittent chatter. If the first tool bit is not yet in continuous contact with the disk surface, steps 412, 414, 416, and 418 are repeated until continuous contact is achieved.

At this time, the operator obtains and notes an acceptable lower limit thickness specification $T_{spec}$ for the brake disk in question in step 422. The thickness specification $T_{spec}$ is typically indicated on the brake disk itself, but frequently becomes unreadable due to dirt and/or corrosion. When such is the case, the thickness specification $T_{spec}$ can be obtained from manuals or tables providing this information, or can be retrieved by selecting the appropriate information from a computer database. The thickness specification $T_{spec}$ may be indicated as either a "machine to" value or as a "discard" value. Where both a "machine to" value and a "discard" value are provided, the "machine to" value is used for the thickness specification $T_{spec}$. In step 424, a comparison is made between the specified thickness specification $T_{spec}$ retrieved in step 422 and the measured separation $S_{current}$ between the tool bits (in this example, measured most recently in step 414). If it is determined that the measured separation $S_{current}$ is less than the acceptable lower limit thickness specification $T_{spec}$, then a warning of this condition is provided to the operator in step 426. If this warning is provided when one or both of the tool bits has been brought into continuous cutting contact with the disk surface but neither has been advanced further, the warning indicates that the disk cannot be machined to meet the specifications. In such a case, the brake disk is withdrawn from service and a new brake disk is installed on the vehicle. If one or both of the tool bits have been advanced beyond the point where they are in continuous contact with the associated disk surface, the warning provided in step 426 can indicate to the operator that one or both of the tool bits should be backed away from its associated disk surface to prevent machining the disk to an insufficient thickness. While the comparison step 424 is illustrated as being performed after one of the tool bits has been moved, it should be appreciated that this step could also be performed earlier, to provide the warning of step 426 in cases where the separation $S_{current}$ may be less than the thickness specification $T_{spec}$ before either of the tool bits has made continuous contact with its associated disk surface.

If it is determined in step 424 that the measured separation $S_{current}$ is greater than or equal to the thickness specification $T_{spec}$, then a determination is made in step 428 whether one or both of the tool bits is to be further adjusted. If one of the tool bits has not been moved, as indicated by the corresponding depth of cut value being zero, then that tool bit must be adjusted to bring the tool bit into continuous contact with the associated disk surface.

If further adjustment is desired, then the method returns to step 410. In the case where the second tool bit has not yet been moved, the second tool bit is selected in step 410 and is moved in step 430. In a manner similar to that described above for the first tool bit, as the second tool bit is moved, the separation $S_{current}$ between the tool bits is monitored in step 432, and in step 434 the second depth of cut $X_2$ is reset to the difference between the reference separation $S_{ref}$ and the sum of the current separation $S_{current}$ and the first depth of cut value $X_1$.

$$X_2 = S_{ref} - (S_{current} + X_1) \quad \text{(Equation 2)}$$

The value of the second depth of cut $X_2$ is displayed in step 436. In step 438, a determination is made whether the second tool bit is in continuous engaging contact with the associated disk surface, this determination being made in a manner similar to that described above for the first tool bit. If the second tool bit is not yet in continuous contact with the disk surface, steps 430, 432, 434, and 436 are repeated until continuous contact is achieved, at which point the method proceeds to step 424. In this case, the current separation $S_{current}$ measured in step 432 is compared to the thickness specification $T_{spec}$.

Once it is determined in step 428 that no further adjustment of the position of the tool bits is desired, the method proceeds to step 440 where the brake disk is machined. In step 440, the tool bits are advanced substantially normal to the lathe axis so as to move across the surfaces of the brake disk to resurface the disk and eliminate lateral runout.

Even if both tool bits have been moved into continuous contact with the disk surfaces, it is frequently desirable to further advance the tool bits towards each other to increase the depth of cut of each tool bit by an amount δ. δ is a value, typically determined based on operator experience, that compensates for the situation where the measured separation is not associated with the greatest lateral runout condition, and also avoids excessive wear during cutting due to effects of the grain structure of the brake disk on the tool bits. Typically, a value for δ of less than about 0.015" is employed, and more preferably δ is between about 0.003–0.006".

One scheme for determining in step 428 whether the tool bits should be further advanced is to calculate a new thickness value $T_{calc}$, which is the thickness of the brake disk which would result if the depth of cut of each tool bit were increased by δ. This new thickness value $T_{calc}$ is calculated by subtracting δ twice from the current separation $S_{current}$ measured in either step 414 or step 432, whichever was most recently performed.

$$T_{calc} = S_{current} - 2\delta \quad \text{(Equation 3)}$$

The calculated thickness $T_{calc}$ can then be compared to the thickness specification $T_{spec}$ obtained in step 422 to determine whether each tool bit can be further advanced by δ and still allow the disk to meet the thickness specification $T_{spec}$, or whether the method should proceed to step 440 directly without further adjustment of the tool bits.

It should be noted that steps 422, 424, and 426 could be eliminated to provide a method for setting the depth of cut for a pair of tool bits while requiring only a single gauge. In this method, the separation between the tool bits is not compared to the manufacturer's minimum thickness specification prior to machining. In such cases, the depth of the cuts are set as desired and the tool bits are advanced across the disk to machine the brake disk. Thereafter, the disk is measured to determine its thickness, and the measured thickness is compared to the specified minimum. Since this method may result in machining a disk which does not meet the specification, it may result in unnecessary tool bit wear and loss of operator time. To avoid such, it is preferred to use the separation between the tool bits for comparison to the thickness specification prior to machining.

Figure 7:
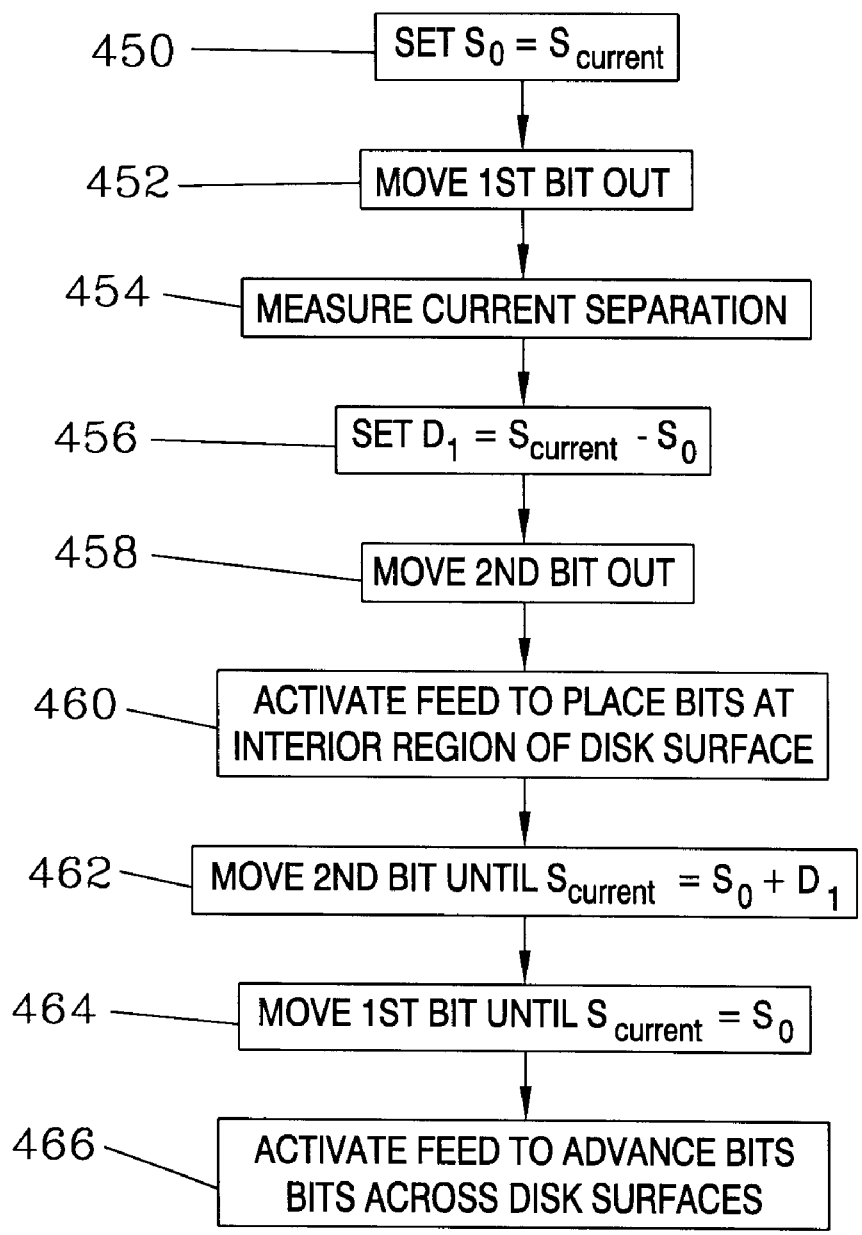
FIGS. 7 and 8 are partial flow diagrams illustrating two alternative series of steps for machining disk surfaces, either of which can be incorporated in the method illustrated in FIG. 6.

In the method discussed above, advancing the tool bits until continuous cutting contact is achieved assures that lateral runout of the disk will be eliminated when the disk is machined. To determine the lateral runout, the tool bits are positioned in close proximity to the outer diameter of the disk surfaces where displacement due to the lateral runout is greatest; however, this position should be maintained within the wear region of the brake surfaces to avoid the ridge which typically forms at the perimeter of the disk. To minimize the chance of collision between the tool holder and the wheel hub, it is generally preferred to machine the disk surfaces radially outward from the interior region of the disk surfaces. Accordingly, step 440 of FIG. 6 may include steps for moving the tool bits normal to the disk surfaces so as to eliminate contact of the tool bits with the disk, advancing the feed mechanism of the lathe to position the tool bits about the interior region of the disk surfaces, and thereafter moving the tool bits back to their respective positions. FIG. 7 shows the steps of one simple example of a method which can be employed to accomplish these actions, and this method could constitute step 440 of FIG. 6.

The method begins at step 450, where the current value of the separation $S_{current}$ is set as a reference value $S_0$. In step 452, one of the tool bits, hereafter referred to as the first tool bit, is then withdrawn from the disk surface until contact is eliminated. The new current separation $S_{current}$ is measured in step 454, and the difference between the current separation value $S_{current}$ and the reference value $S_0$ is set as a differential value $D_1$ in step 456. The remaining tool bit, hereafter referred to as the second tool bit, is then withdrawn from the disk surface in step 458 until contact is eliminated.

After both tool bits have been displaced normal to the disk surfaces, the feed mechanism of the lathe is activated to move the tool bits to the interior region of the disk surfaces, as indicated in step 460. This displacement should be sufficient to assure that the total region of the disk surfaces which is contacted by brake pads when in service will be resurfaced by the tool bits, while not advancing to a position where the tool bits or tool holders contact the wheel hub. In step 462, the second tool bit is then advanced axially inwards towards the disk until the current separation $S_{current}$ between the tool bits is equal to the sum of the reference value $S_0$ and the differential value $D_1$. The first tool bit is then moved in step 464 until the current separation is equal to the reference value $S_0$. The feed mechanism of the lathe is then activated to move the tool bits away from the wheel hub and across the disk surfaces to machine the disk in step 466.

Figure 8:
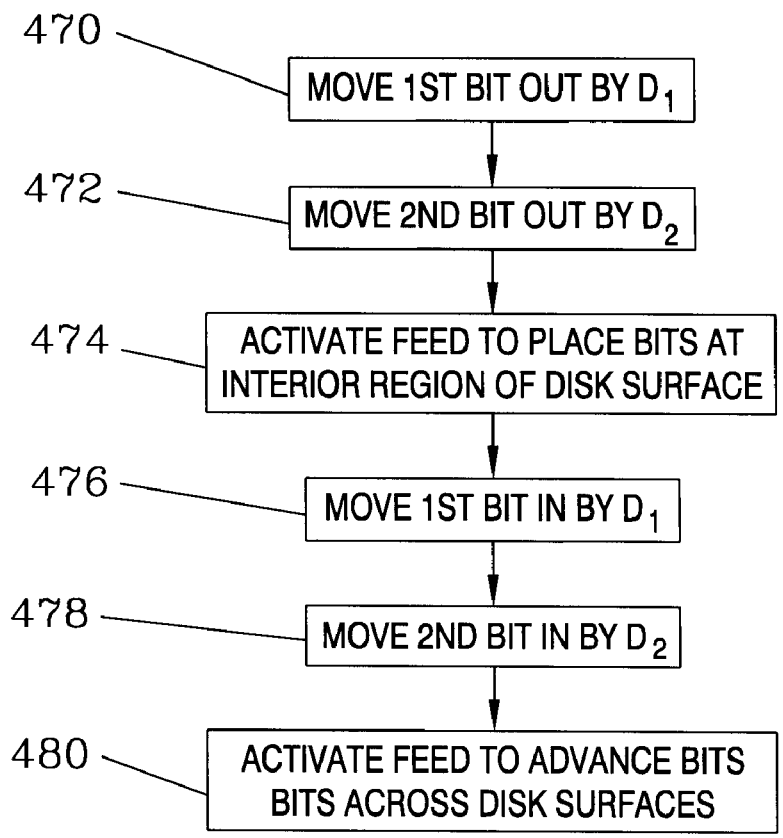

When the tool bits are provided with indexing mechanisms which assure accurate repositioning of the tips, an alternative method for machining the disk can be employed, as is illustrated in FIG. 8. In this method, the first tool bit is moved away from the brake disk by a certain amount $D_1$ in step 470. The amount $D_1$ can be determined by the mechanism for moving the first tool bit, such as a certain number of turns of a knob or a certain number of steps taken by a stepping motor. Similarly, the second tool bit is moved away from the brake disk by a certain amount $D_2$ in step 472. Once both tool bits have been moved back from the disk, in step 474 the feed is activated to move the tool bits to the interior region of the disk surfaces as discussed above. The first tool is then advanced towards the disk by the amount $D_1$ in step 476, and the second tool bit is advanced towards the disk by the amount $D_2$ in step 478. The feed mechanism of the lathe can then be activated to move the tool bits across the disk surfaces, as indicated by step 480.

Figure 9:
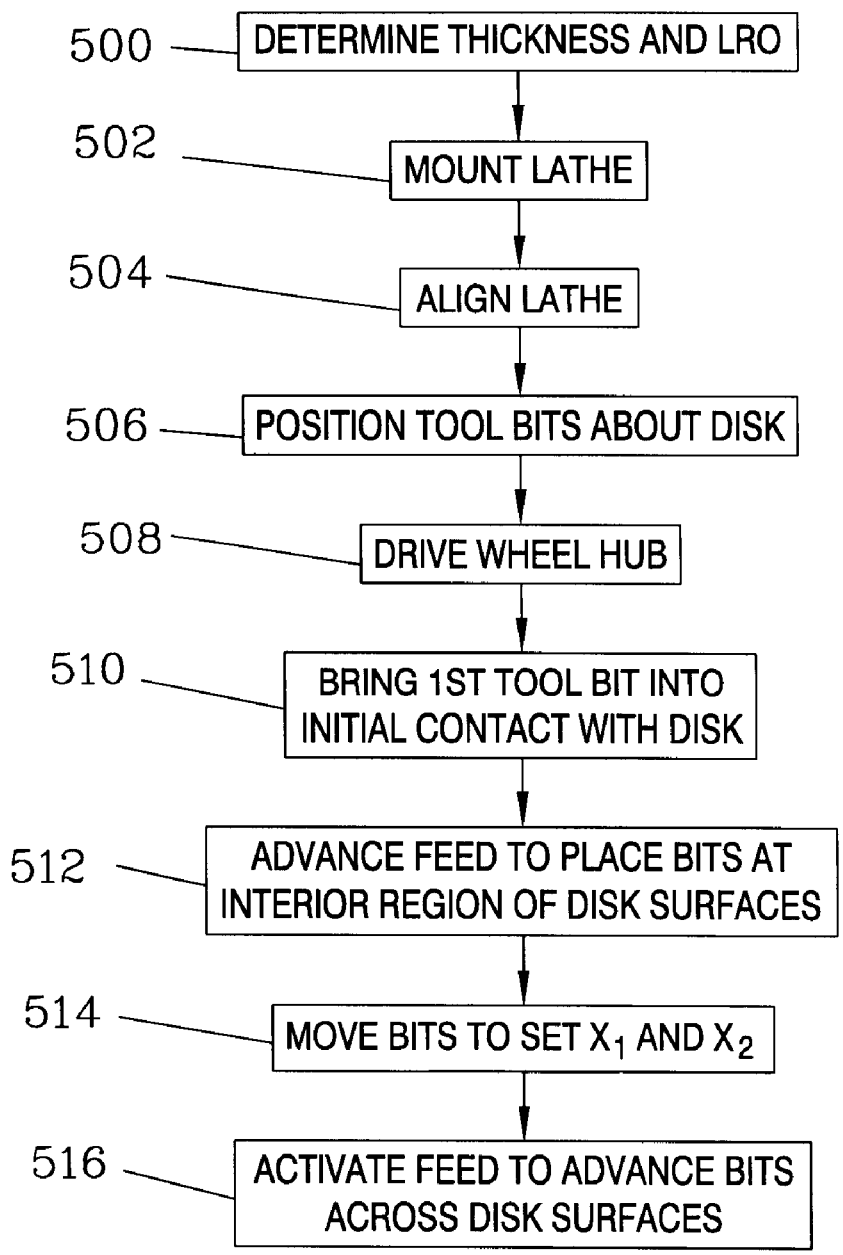
FIG. 9 is a flow diagram illustrating an alternative method for machining a brake disk when measurement of the thickness and lateral runout of the disk are performed prior to mounting a lathe.

Frequently, a brake disk is tested to determine its thickness $T_0$ and lateral runout LRO prior to machining. Such is particularly beneficial when using instrumentation to measure these values while the wheel remains in place over the disk, such as by use of the invention discussed in the '427 patent, since this avoids the effort of removing the wheel and mounting the lathe if the disk does not need to be machined. In such cases, the lathe of the present invention can be employed in practicing a method which does not employ the displacement gauge to determine the thickness of the disk which will result from machining. The steps of this method are shown in FIG. 9.

In step 500, the thickness $T_0$ and lateral runout LRO of the brake disk are determined by measurement, such as with the device taught in the '427 patent, and these values are recorded. Preferably, the measurements are taken with an instrument which can subsequently provide these values directly to a memory associated with the lathe. In step 502, the wheel is removed and the lathe is mounted to the wheel hub. The lathe axis is then aligned with the hub axis in step 504, the tool bits are positioned about the brake disk in step 506, and the wheel hub is driven by the lathe in step 508. It should be noted that a lathe system could be employed which has the capability to determine the thickness $T_0$ and lateral runout LRO of the brake disk, in which case the determination of step 500 is made after the steps of mounting and aligning the lathe and driving the wheel hub.

As the hub is rotated, one of the tool bits of the lathe is advanced until it makes initial contact with its corresponding disk surface, as indicated in step 510. This initial contact should be made near the outer diameter of the disk as discussed above. The feed mechanism of the lathe is then activated to move the tool bits inwards to a position where the tool bits are positioned about the interior region of the disk surfaces, as indicated in step 512.

The tool bits are then positioned to set a first depth of cut $X_1$ and a second depth of cut $X_2$ in step 514. Typically, each depth of cut ($X_1$, $X_2$) is equal to the lateral runout LRO plus a small additional amount $\delta$. Step 514 can be performed according to various schemes. In one scheme, the current value of the separation $S_{current}$ is set as a reference separation $S_{ref}$, and the first tool bit, which has made contact with the disk, is moved to set the first depth of cut $X_1$, while the second tool bit remains stationary. In this case, the first tool bit is moved until the separation $S_{current}$ equals the reference separation $S_{ref}$ minus the sum of the lateral runout LRO and $\delta$.

$$S_{current}=S_{ref}-(LRO+\delta) \qquad \text{(Equation 4)}$$

The second tool bit is then moved while the first tool bit remains stationary, until the separation $S_{current}$ equals the thickness $T_0$ minus the sum of the lateral runout LRO and twice $\delta$.

$$S_{current}=T_0-(LRO+2\delta) \qquad \text{(Equation 5)}$$

In an alternative scheme, which does not require storing a reference separation value, the second tool bit is positioned to set the second depth of cut $X_2$ before the first tool bit is moved. The second tool bit is advanced until the separation $S_{current}$ equals the thickness $T_0$ minus $\delta$.

$$S_{current}=T_0-\delta \qquad \text{(Equation 6)}$$

The first tool bit is then advanced until the separation $S_{current}$ equals the thickness $T_0$ minus the sum of the lateral runout LRO and twice $\delta$.

$$S_{current}=T_0-(LRO+2\delta) \qquad \text{(Equation 7)}$$

After the tool bits have been positioned to set the first depth of cut $X_1$ and the second depth of cut $X_2$ in step 514, the feed mechanism of the lathe is activated in step 516 to move the tool bits across the disk surfaces.

In view of the nature of the methods discussed above, it should be apparent to one skilled in the art that the method is well suited for implementation with the automated lathe alignment technology of the above referenced patents and application, and the device of the present invention, in combination with a microprocessor to integrate and co-ordinate many of the functions otherwise left to the control of the operator.

Figure 10:
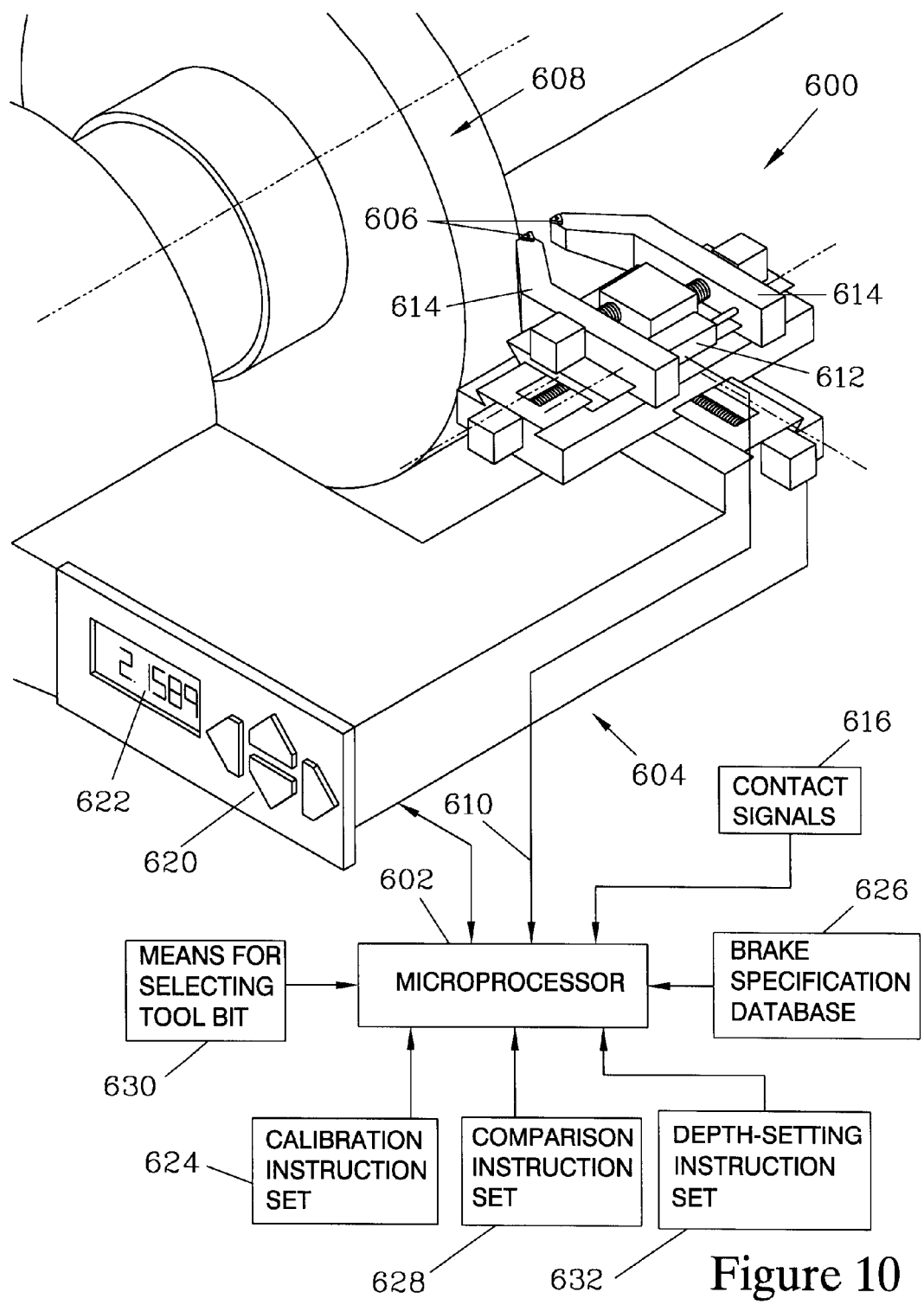
FIG. 10 is a schematic view illustrating one embodiment of a system of the present invention which includes the improved on-vehicle brake lathe illustrated in FIG. 3.

FIG. 10 illustrates a lathe system 600, which employs a microprocessor 602 which communicates with an on-vehicle disk brake lathe 604. When the disk brake lathe 604 includes a microprocessor to process signals for automatically aligning the hub axis with the lathe axis, as taught in U.S. Pat. Nos. 5,974,878 and 6,050,160 and application Ser. No. 09/182,429, this microprocessor could also serve as the microprocessor 602. When the disk brake lathe 604 is equipped with servo mechanisms, such as the servos shown in FIGS. 3–5 and discussed above, the microprocessor 602 can be used to control operation of the servos which position a pair of tool bits 606 of the disk brake lathe 604 with respect to a brake disk 608.

The microprocessor 602 receives gauge signals 610 from a displacement gauge 612 on the disk brake lathe 604 to allow the microprocessor 602 to monitor the displacement gauge 612. The displacement gauge 612, in turn, is responsive to changes in the separation of a pair of tool holders 614.

When calibration of the displacement gauge 612 is to be performed under the direction of the microprocessor 602, the disk brake lathe 604 is also provided with at least one contact sensor (not shown) which is responsive to interference between the tool bits 606. The at least one contact sensor generates contact signals 616. The contact sensor could be a strain sensor, vibration sensor, or other sensor directly responsive to movement of the tool bits 606 into interference with each other, and could be located at various positions on the disk brake lathe 604, including being located internal to the disk brake lathe 604. Alternatively, the at least one contact sensor could be indirectly responsive to interference of the tool bits 606. For example, if an electrical potential is established between the tool bits 606 such that contact therebetween causes a current to flow, a current meter could serve as to generate the contact signals 616. To calibrate the displacement gauge 612, the contact signals 616 could also be used in combination with instructions (either encoded into the microprocessor or under the direction of the operator) to move the tool bits 606 into contact with each other when the brake disk 608 is not positioned therebetween and, when interference is sensed, to stop the advancement of the tool bits 606 and set the output of the displacement gauge 612 to zero. To assure that the tool bits 606 are not contacting the brake disk 608 or other object inadvertently interposed therebetween, the gauge signals 610 can be checked to confirm that the separation indicated is below a set value.

An alternative scheme for calibration of the displacement gauge 612, not illustrated, could be accomplished by moving the tool bits 606 until stops are engaged, to establish a specified separation between the tool bits 606. In such cases, the at least one contact sensor provides the contact signals 616 in response to the engagement of the stops. For purposes of illustration, the discussion of contact sensors herein assumes that the at least one contact sensor is responsive to interference between the tool bits.

Depending on the type of the contact sensor employed to generate the contact signals 616, it may be capable of detecting contact between the tool bits 606 as well as contact between the tool bits 606 and the respective surfaces of the brake disk 608 which they will resurface. The contact signals 616 provided by the at least one contact sensor contain sensory information with regard to tool bits 606. This sensory information can provide notice of the tool bits 606 being in contact with each other and provide notice of the tool bits 606 being in either initial or continuous contact with the brake disk 608. These contact signals 616 are supplied to the microprocessor 602, and in combination with a set of instructions can be used to instruct the microprocessor 602 to stop advancing the tool bits 606. If the contact signals 616 indicate that the tool bits 606 are in contact with each other, then a set of instructions to the microprocessor 602 allows the microprocessor 602 to calibrate the displacement gauge 612. When the tool bits 606 are positioned over the brake disk 608 and the contact sensors are first providing intermittent signals, such indicates that initial contact with the brake disk 608 has been achieved, and when the contact signals 616 are constant, such indicates that continuous cutting contact has been achieved. Such notice, in combination with the gauge signals 610, would allow the determination of the depth of cut to be obtained without the physical observation of the operator.

When a single contact sensor is employed to indicate contact of the tool bits 606 with the brake disk 608, the tool bits 606 must be advanced individually. The microprocessor 602 can then attribute variation in the contact signals 616 to the relative position of whichever tool bit 606 is currently being moved. Once one of the tool bits 606 has been advanced to a position of initial or continuous cutting contact with the brake disk 608, the other of the tool bits 606 can be moved, and the microprocessor 602 attributes any subsequent variation in the contact signals 616 to the relative position of the latter-moved tool bit 606. When the lathe 604 includes a rate sensor to facilitate automatic alignment of the lathe axis with the hub axis, the rate sensor can be employed as a contact sensor by monitoring the response of the rate sensor to high frequency vibrations caused by contact of the tool bits 606 with the brake disk 608.

Since the use of a single contact sensor requires complex signal processing to interpret the contact signals 616, it is preferred to employ a separate contact sensor for each of the tool bits. With the microprocessor 602, the use of separate contact sensors makes it possible to simultaneously advance the tool bits 606 into initial contact with the surfaces of the brake disk 608, since each tool bit 606 can be separately monitored and advancement stopped when the desired contact of the brake disk 608 with the tool bit 606 being monitored is achieved.

When it is desired to further automate the lathe system 600, such can be achieved with additional instruction sets and/or by direct instructions provided by the operator through a user interface 620. The user interface 620 is an interface which either communicates directly with the disk brake lathe 604, such as a control panel, or alternatively communicates directly to the microprocessor 602. When the disk brake lathe 604 is responsive to the microprocessor 602, the instructions can be implemented directly by the microprocessor 602 for operating the brake lathe 604. Alternatively, the appropriate instructions may be displayed to the operator on a display 622 to prompt the operator to activate a particular control on the brake lathe 604.

As noted above, a calibration instruction set 624 can provide instructions for calibrating the displacement gauge 612. These instructions typically include instructions for moving the tool holders 614 until the contact signals 616 indicate that the tool bits 606 are in contact with each other, ceasing motion of the tool holders 614 at such time, and setting the gauge signals 610 as indicating a separation of zero between the tool bits 606.

The thickness which will result after the brake disk 608 is machined to remove lateral runout is readable from the displacement gauge 612 when the tool bits 606 have been positioned at their final cutting positions. For example, if vibration sensors are employed for the contact sensors, the contact signals 616 can be processed by the microprocessor 602 to determine when the character of vibration indicates continuous rather than intermittent contact between each of the tool bits 606 and the disk 608.

Once the tool bits 606 are in continuous cutting contact with the surfaces of the brake disk, the microprocessor 602 can be used to compare the separation indicated by the gauge signals 610 to the specifications for the minimum acceptable thickness of the brake disk, provided the specifications are accessible to the microprocessor 602. The specifications can be input through the user interface 620 if such is provided with a keyboard, or can be provided directly to the microprocessor 602 from a specification database 626. The specification database 626 may be in a memory associated with the microprocessor 602, may be a central database to which the microprocessor 602 has access, or may be on a storage device such as a CD-ROM, floppy disk, etc. which communicates with the microprocessor 602. Devices for providing such specifications and allowing an operator to select an appropriate specification are discussed in further detail in U.S. Pat. No. 5,970,427.

A comparison instruction set 628 provides instructions for directing the microprocessor 602 to compare the measured separation indicated by the gauge signals 610 to the appropriate specifications. Preferably, the microprocessor 602 then outputs to the display 622 an indication to the operator of the result of the comparison, to provide notice to the operator to proceed machining the brake disk, if the standard is met, or to discard the brake disk, if the standard is not met. The display 622 may also indicate to the operator the current value of the separation measured by the displacement gauge 612, and the depths of cut for each of the tool bits 606. When the system is automated, the microprocessor 602 may be instructed to direct the disk brake lathe 604 to execute a series of machining steps to position the tool bits 606 in the proper positions to initiate cutting of the brake disk 608, and to automatically advance the tool bits 606 to machine the surfaces of the brake disk 608. In this case, the display 622 may only be employed to advise the operator when the brake disk fails to meet the specifications and must be replaced.

To allow setting the depth of cut for each of the tool bits 606 beyond the minimum cut where continuous cutting contact of the tool bits 606 with the surfaces of the brake disk 608 is achieved, means for selecting a tool bit 630 are provided in combination with a depth setting instruction set 632. The means for selecting a tool bit 630 allow advancement of a selected one of the tool bits 606 while the other remains stationary. Such means 630 could be provided through the user interface 620, or could be independent means which communicate directly to either the disk brake lathe 604 or, as illustrated in FIG. 10, to the microprocessor 602. Preferably, the depth setting instruction set 632 provides instructions to record the current value for the separation indicated by the gauge signals 610 and compare subsequent values to this recorded value, the difference providing a value for the depth of cut for the selected tool bit 606 which can be presented on the display 622.

Figure 11:
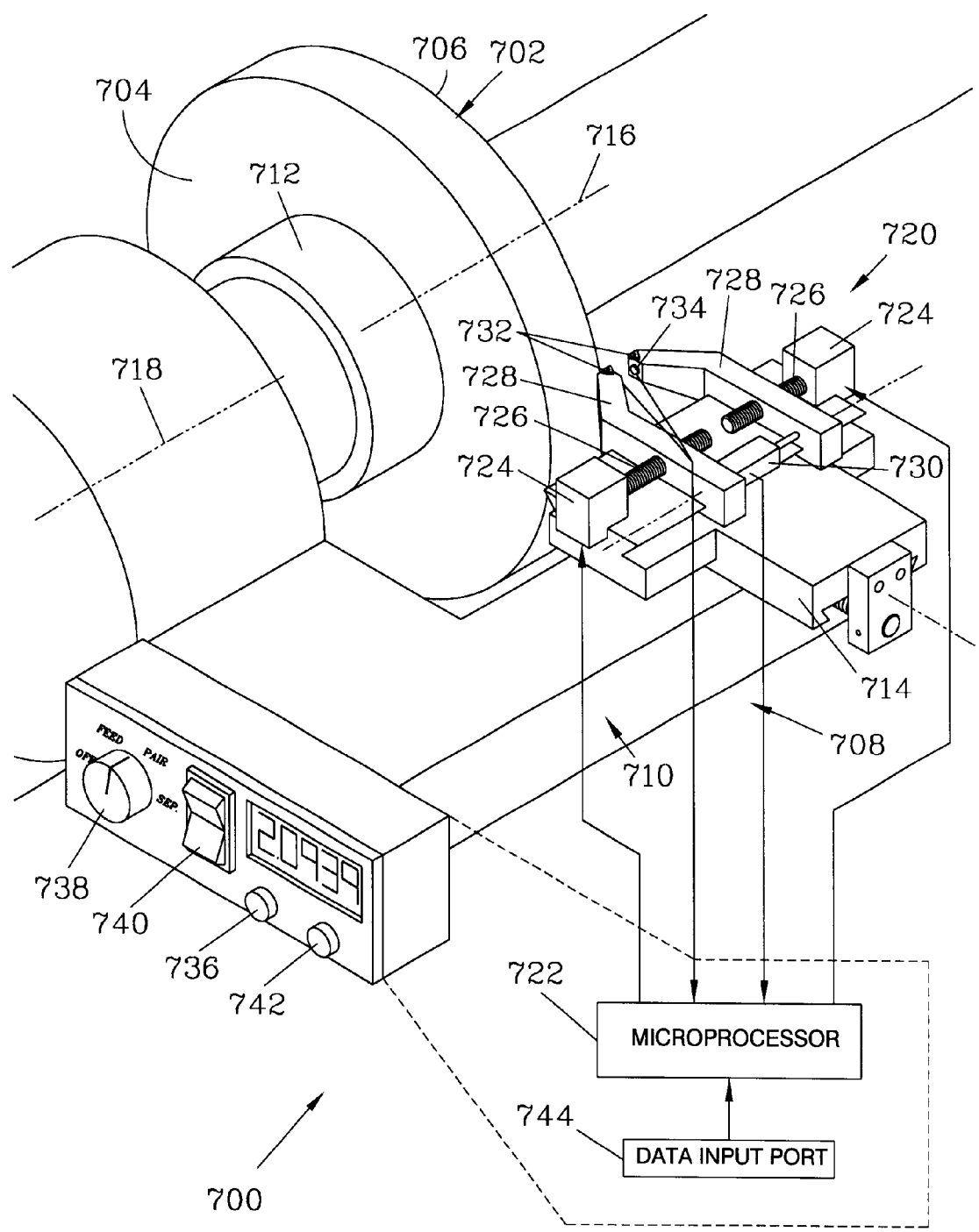
FIG. 11 is a schematic view illustrating an embodiment of a system of the present invention which provides automation of many of the lathe functions.

FIG. 11 illustrates an automated lathe system 700 of a preferred embodiment of a system such as discussed above. The automated lathe system 700 allows machining a brake disk 702 having a first disk surface 704 and a second disk surface 706 by operators without requiring extensive training. The automated lathe system 700 employs an on-vehicle disk brake lathe 708 which has a frame 710 that attaches to a wheel hub 712 and terminates in a slidably attached tool assembly platform 714. The wheel hub 712 has a hub axis 716, while the disk brake lathe 708 has a lathe axis 718, which is aligned with the hub axis 716 when the disk brake lathe 708 is aligned for turning the brake disk 702. The disk brake lathe 708 has a cutting tool assembly 720 which is similar to the cutting tool assembly 302 illustrated in FIG. 5.

A microprocessor 722 is also provided, which is central to the automation of the lathe system 700. The disk brake lathe 708 of this embodiment includes an automated axis alignment mechanism (not shown), such is described in U.S. Pat. Nos. 5,974,878 and 6,050,160 as well as in application Ser. No. 09/182,429. This alignment mechanism is preferably operated in accordance with instructions provided by the microprocessor 722.

The cutting tool assembly 720 for the automated lathe system 700 has a pair of servos 724 which operate threaded shafts 726. The threaded shafts 726 threadably engage a pair of tool holders 728 and serve to move the tool holders 728 when the servos 724 are activated, as discussed above when describing the embodiment shown in FIG. 5. In this embodiment, the servos 724 can be activated under the instruction of the microprocessor 722.

To determine the condition of the brake disk 702, a displacement gauge 730 is provided which is connected to the pair of tool holders 728 so as to measure the change in their separation, which corresponds to the separation of a pair of tool bits 732 attached to the tool holders 728. Preferably, the displacement gauge 730 provides a digital signal so that it may be directly processed by the microcomputer 722. In addition to the displacement gauge 730, a pair of contact sensors 734 (only one of which is shown) are provided. These contact sensors 734 are employed to monitor the tool bits 732 and provide notice when the tool bits 732 either contact each other or, alternatively, contact one of the disk surfaces (704, 706). These contact sensors 734 provide signals to the microprocessor 722 to indicate the state of contact of the tool bits 732. Examples of sensors which are felt to be particularly suitable are vibratory and acoustical sensors.

A calibrate button 736 is provided for the operator, which allows the operator to calibrate the displacement gauge 730 when the brake disk 702 is not positioned between the tool bits 732. When calibration is to be performed, the tool bits 732 are positioned beyond the perimeter of the brake disk 702, such as is the case when the disk brake lathe 708 is first mounted to the wheel hub 712. As discussed above, checks can be programed into the microprocessor 722 to assure that this condition is met before the calibration can be initiated. The calibration button 736 starts a calibration routine by the microprocessor 722, which advances the tool holders 728 towards each other until contact of the tool bits 732 is sensed, at which time advancement is stopped and the displacement gauge 730 is zeroed. As noted earlier, calibration could alternatively be accomplished by moving the tool holders 728 until stops are engaged to establish a reference separation between the tool bits. Such an approach could allow calibration while the brake disk 702 remains positioned between the tool bits 732.

After calibration, the tool bits 732 are moved apart to allow them to be positioned about the brake disk 702. Such motion could be part of the calibration routine, or can be accomplished manually by the operator with a combination of a mode switch 738 and a two-position switch 740. When the mode switch 738 is positioned in a "SEPARATION" mode, the operator can manually move the tool bits 732 with the two-position switch 740, in the manner discussed earlier with respect to FIG. 5.

Once the tool bits 732 are sufficiently separated to accommodate the brake disk 702 therebetween, the tool bits 732 can be positioned in a pair-wise manner such that the brake disk surfaces (704, 706) will pass therebetween. This motion can be provided by placing the mode switch 738 in a "PAIR" mode and using the two-position switch 740 as is further discussed with regard to FIG. 5 to center the tool bits 732 with respect to the brake disk 702.

After the tool bits 732 have been separated sufficiently to accommodate the brake disk 702 and the tool bits 732 have been centralized with respect to the brake disk 702, the tool assembly platform 714 is moved to place the tool bits 732 on either side of the brake disk 702. By placing the mode switch 738 in a "FEED" position, the two-position switch 740 can be used by the operator to move the tool assembly platform 714 to advance the tool bits 732 normal to the lathe axis 718 so that the tool bits 732 reside over the extremity of the disk 702. The details of the mechanism for providing such motion is associated with the disk brake lathe 708 and thus is not shown. Thereafter, the operator initiates the execution of a measuring routine to check the thickness of the brake disk 702 which will result after machining by pressing a check button 742. As the disk brake lathe 708 rotates the brake disk 702, the measuring routine advances the tool bits 732 toward the disk surfaces (704, 706) until such time as the contact sensors 734 detect continuous contact between each of the tool bits 732 and its associated disk surface (704, 706). At such time as this continuous contact is achieved, the contact sensors 734 provide a signal to the microprocessor 722 to store the current reading of the displacement gauge 730 and stop the advancement of the tool bits 732.

The microprocessor 722 is provided with a look-up table for the acceptable disk thickness specifications for existing models of vehicles. Preferably, these specifications are provided though a data input port 744 so that they can be updated as new models of vehicles are introduced into the market. The operator can input the model and year of the vehicle for which the brake disk 702 is being machined via an interactive operator interface such as a keyboard (not shown). A comparison routine is executed to establish the state of the brake disk 702 by determining whether the thickness which will result from machining, as indicated by the current reading of the displacement gauge 730, is sufficient to meet the appropriate specification.

If such is the case, the microprocessor 722 executes a machining routine, where the tool bits 732 are separated, the tool assembly platform 714 advances the tool bits 732 to the inner region of the disk 702, the tool bits 732 are returned to their earlier separation, and the tool assembly platform 714 advances the tool bits 732 outward from the wheel hub 712 to machine the disk surfaces (704, 706).

Figure 12:
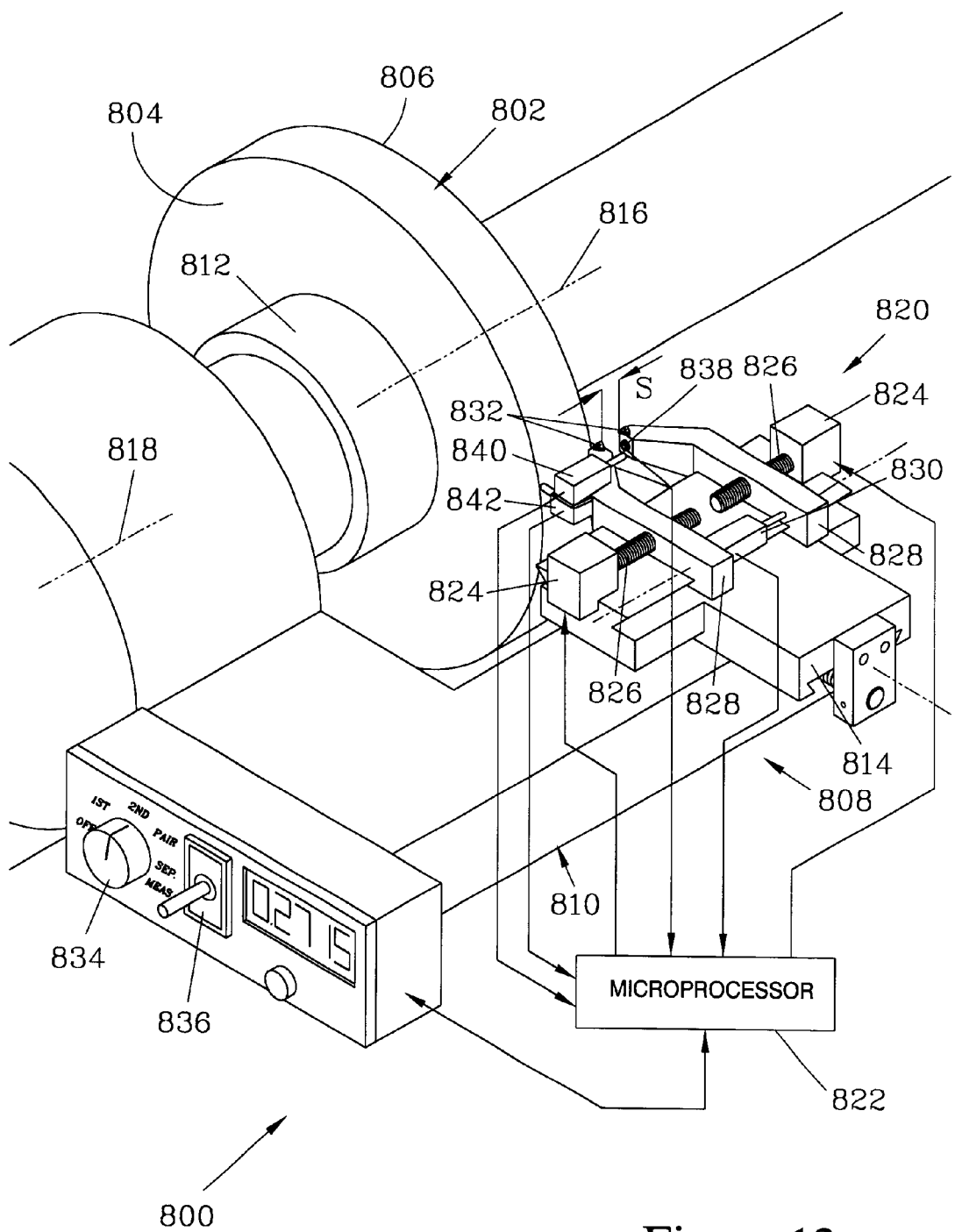
FIG. 12 is a schematic view illustrating an embodiment of a system of the present invention which facilitates measurement of disk thickness and lateral run-out prior to machining the disk.

FIG. 12 illustrates a lathe system 800 which forms another preferred embodiment of a system of the present invention. The lathe system 800 not only facilitates machining a brake disk 802 having a first disk surface 804 and a second disk surface 806, but also facilitates determining the thickness and lateral run-out of the brake disk 802 prior to machining, rather than performing a preliminary cut to establish the lateral run-out of the brake disk 802.

The lathe system 800 again employs an on-vehicle disk brake lathe 808 having a frame 810 that attaches to a wheel hub 812 and terminates in a slidably attached tool assembly platform 814. The wheel hub 812 has a hub axis 816, and the disk brake lathe 808 has a lathe axis 818, which is substantially aligned with the hub axis 816 when adjusted for turning the brake disk 802. The disk brake lathe 808 has a cutting tool assembly 820 mounted to the tool assembly platform 814.

A microprocessor 822 is provided, which serves to implement a variety of functions of the disk brake lathe 808. The cutting tool assembly 820 for the lathe system 800 has a pair of servos 824 which operate threaded shafts 826 to move a pair of tool holders 828. These servos 824 can be operated under the instruction of the microprocessor 822, as well as manually by the operator. A separation gauge 830 is connected to the pair of tool holders 828 to measure the change in their separation, which corresponds to the separation S of a pair of tool bits 832.

Motion of the tool holders 828 is designed to be controlled, in part, manually by the operator using a mode switch 834 in combination with ajoystick 836. The mode switch 834 functions in a manner similar to that discussed above with respect to the mode switch 738 shown in FIG. 11, while the joystick 836 controls both the direction and speed of motion of the tool holders 828.

The lathe system 800 is also provided with a pair of disk proximity sensors 838 (only one of which is shown), one mounted to each of the tool holders 828 in close proximity to the associated tool bit 832. These disk proximity sensors 838 detect when the associated tool holder 828 moves such that the tool bit 832 comes within a specified collision distance $D_C$ from one of the disk surfaces (804, 806), and serve to avoid collision of the tool bits 832 with the brake disk 802. It should be noted that the collision distance $D_C$ for each of the tool bits 832 need not be the same. The disk proximity sensors 838 can provide a signal to warn the operator to stop motion of one or both of the tool holders 828 or, more preferably, provide a signal which results in interrupting power to one or both of the servos 824. In all cases, the disk proximity sensors 838 serve to avoid collision of the tool bits 832 with the brake disk 802. In the latter case, the power interruption can be overridden by the operator to advance the tool holders 828 further as needed. The response of the servos 824 to the signals from the disk proximity sensors 838 could be implemented through circuitry or, when the servos 824 are responsive to the microprocessor 822, such could be implemented through instructions provided to the microprocessor 822.

The lathe system 800 also has a surface displacement gauge 840, which in this embodiment is mounted on one of the tool holders 828. When the brake disk 802 is positioned between the tool holders 828, the surface displacement gauge 840 is responsive to variation in the separation between the tool holder 828 to which it is mounted and the opposing disk surface (804 as illustrated). Thus, when the tool holder 828 remains stationary as the brake disk 802 is rotated, the surface displacement gauge 840 can measure the lateral run-out LRO of the brake disk 802 in the manner well known in the art. Circuitry is provided for determining the lateral run-out LRO from the signals generated by the surface displacement gauge 840. Preferably, the surface displacement gauge 840 communicates with the microprocessor 822 to allow the microprocessor 822 to calculate the lateral run-out LRO. While the surface displacement gauge 840 illustrated is mounted to one of the tool holders 828, it should be appreciated that the surface displacement gauge 840 could be mounted elsewhere on the disk brake lathe 808, as long as it can be fixably positioned with respect to a plane normal to the hub axis 816. However, mounting the surface displacement gauge 840 to one of the tool holders 828 allows it to be readily positioned to measure lateral run-out LRO near the outer diameter of the brake disk 802. When the surface displacement gauge 840 is mounted to one of the tool holders 828, the signals from the disk proximity sensor 838 associated with that tool holder 828 can be employed to interrupt power to stop the tool holder 828 when it reaches a position where the associated disk surface (804 as illustrated) is within the range of sensitivity of the surface displacement gauge 840, to help assure the validity of the lateral run-out LRO measurement.

The surface displacement gauge 840 has particular benefits when the response of the servos 824 to the proximity sensors 838 is sufficiently accurate as to allow the tool bits 832 to be stopped with the collision distance $D_C$ serving as a reference separation between each of the tool bits 832 and the associated disk surfaces (804, 806). When the tool bits 832 are positioned with a high degree of precision at the collision distance $D_C$ from the disk surfaces (804, 806) and the lateral run-out LRO is known, the thickness T of the brake disk 802 will be equal to the separation S between the tool bits 832, as measured by the gauge 830, minus the sum of the collision distance $D_C$ for each of the tool bits 832 and the lateral run-out LRO:

$$T = S - (D_C + D_C + LRO) \quad \text{(Equation 8)}$$

This calculation could be performed by the microprocessor 822 by providing an appropriate instruction set. To assure the accuracy of such, the radial position at which the surface displacement gauge 840 measures the disk surface 804 should be substantially equal to the radial positions of the tool bits 832. Since the lathe system 800 allows determination of the thickness T and the lateral run-out LRO of the brake disk 802 prior to machining, the lathe system 800 could be readily employed to practice the method discussed above with regard to FIG. 9.

When such is the case, a rate sensor (not shown) used by the disk brake lathe 808 to align the lathe axis 818 with the hub axis 816 can be employed as a contact sensor to detect contact of one of the tool bits 832 with the brake disk 802. The contact of the tool bit 832 with one of the disk surfaces (804, 806) establishes high frequency vibrations which can be sensed by the rate sensor, allowing the detection of initial contact by the tool bit 832.

When it is desired to machine the disk surfaces (804, 806) from the outer diameter inwards, it is preferred that a hub proximity sensor 842 be provided. The hub proximity gauge 842 is similar in function to the disk proximity sensors 838 discussed above, but is responsive to the proximity of the tool holders 828 and other elements of the cutting tool assembly 820 with respect to the wheel hub 812 and related elements. The hub proximity sensor 842 serves to avoid collision of the tool holders 828 with the wheel hub 812, and can either provide a warning or, more preferably, stop the feed mechanism of the disk brake lathe 808 to cease advancement of the cutting tool assembly 820.

As noted above, the motion of the tool holders 828 is controlled by the mode switch 834 in combination with the joystick 836. The mode switch 834 functions similarly to the mode switch 738 shown in FIG. 11; however, the mode switch 834 additionally has a "MEASURE" position. In this position, the servos 824 are inactive to prevent accidental motion of the tool holders 828 while the surface displacement gauge 840 measures the lateral run-out LRO of the brake disk 802. To position the tool holders 828 when the mode switch 834 is in one of its other positions other than "OFF", the joystick 836 is employed. The joystick 836 allows control of the direction of motion of the tool holders 828, in a manner similar to that of the two-position switch 740. Additionally, the joystick 836 allows control of the speed of such motion. The speed of such motion increases as the displacement of the joystick 836 from its central position is increased. In combination with the disk proximity sensors 838, the joystick 836 can be employed to rapidly move the tool holders 828 to the position where the tool bits 832 are separated from the disk surfaces (804, 806) by the collision distance $D_C$, and thereafter employed to gradually advance the tool bits 832 into contact with the disk surfaces (804, 806).

While the novel features of the present invention have been described in terms of particular embodiments and preferred applications, it should be appreciated by one skilled in the art that substitution of materials and modification of details obviously can be made without departing from the spirit of the invention.

What we claim is:

1. An improved on-vehicle disk brake lathe which attaches to a wheel hub having a brake disk attached thereto, the wheel hub having a hub axis about which both the wheel hub and the brake disk rotate, the brake disk having a first disk surface and a second disk surface, the disk brake lathe having,
   a frame attachable to the wheel hub and having a lathe axis,
   means for aligning the hub axis with the lathe axis,
   a drive mechanism for rotating the wheel hub about the lathe axis,
   a first tool bit which is engagable with the first disk surface,
   a second tool bit which is engagable with the second disk surface, and
   means for advancing the first tool bit and the second tool bit along a feed path which is normal to the hub axis,
the improvement comprising:
   a first tool holder for supporting the first tool bit, said first tool holder being translatably engaged with respect to the frame such that it traverses a first tool holder path which is parallel to the lathe axis;
   means for moving said first tool holder along said first tool holder path to adjust the spatial separation between the first disk surface and the first tool bit;
   a second tool holder for supporting the second tool bit, said second tool holder being translatably engaged with respect to the frame such that it traverses a second tool holder path which is parallel to the lathe axis;
   means for moving said second tool holder along said second tool holder path to adjust the spatial separation between the second disk surface and the second tool bit;
   a displacement gauge connected between said first tool holder and said second tool holder so as to respond to changes in the spatial separation therebetween, said displacement gauge providing a gauge signal responsive to said changes in separation; and
   means for reporting said gauge signal of said displacement gauge.

2. The improved on-vehicle disk brake lathe of claim 1 wherein the lathe further has,
   a cutting tool assembly on which the first tool bit and the second tool bit are mounted, the cutting tool assembly having a platform which is mounted to the frame of the lathe, and
wherein the means for advancing the first tool bit and the second tool bit along a feed path which is normal to the hub axis comprises,
   means for advancing the platform along the feed path which is normal to the hub axis,
the improvement further wherein,
   said first tool holder is translatably engaged with respect to the platform so as to be translatable with respect to the frame along said first tool holder path; and
   said second tool holder is translatably engaged with respect to the platform so as to be translatable with respect to the frame along said second tool holder path.

3. The improved disk brake lathe of claim 1 wherein the improvement further comprises:
   means for coordinating movement of said first tool holder along said first tool holder path with movement of said second tool holder along said second tool holder path.

4. The improved disk brake lathe of claim 2 wherein the improvement further comprises:
   means for coordinating movement of said first tool holder along said first tool holder path with movement of said second tool holder along said second tool holder path.

5. The improved disk brake lathe of claim 3 wherein said means for coordinating movement of said first tool holder with movement of said second tool holder is provided by means for operating said means for moving said first tool holder along said first tool holder path and said means for moving said second tool holder along said second tool holder path in a coordinated manner.

6. The improved disk brake lathe of claim 4 wherein said means for coordinating movement of said first tool holder with movement of said second tool holder is provided by means for operating said means for moving said first tool holder along said first tool holder path and said means for moving said second tool holder along said second tool holder path in a coordinated manner.

7. The improved disk brake lathe of claim 3 wherein the lathe further comprises:
   a platform which translatably engages the lathe frame so as to traverse the feed path which is normal to the hub axis,
further wherein the means for advancing the first tool bit and the second tool bit along a feed path which is normal to the hub axis comprises,
   means for advancing the platform along the feed path which is normal to the hub axis, and
still further wherein said means for coordinating movement of said first tool holder with movement of said second tool holder further comprises:
   a support plate which translatably engages the platform and traverses a support plate path which is normal to the feed path and parallel to the lathe axis, said support plate having at least one of said tool holders translatably mounted thereon; and means for moving said support plate with respect to the platform so as to adjust the axial position of both of said tool holders with respect to the disk surfaces.

8. The improved disk brake lathe of claim 4 wherein said means for coordinating movement of said first tool holder with movement of said second tool holder further comprises:

a support plate which translatably engages the platform and traverses a support plate path which is normal to the feed path and parallel to the lathe axis, said support plate having at least one of said tool holders translatably mounted thereon; and means for moving said support plate with respect to the platform so as to adjust the axial position of both of said tool holders with respect to the disk surfaces.

9. The improved disk brake lathe of claim 8 wherein the improvement further comprises:

locking means for preventing motion of said first tool holder along said first tool holder path, and to prevent motion of said second tool holder along said second tool holder path.

10. A method for determining lateral run-out of a brake disk having a pair of disk surfaces, using an on-vehicle disk brake lathe having a lathe axis and a pair of tool bits while the brake disk is mounted to a wheel hub rotatably mounted about a hub axis, the method comprising the steps of:

mounting the lathe to the wheel hub;

aligning the lathe axis with the hub axis;

driving the wheel hub to rotate the disk about the hub axis;

positioning one of the tool bits of the lathe in close proximity to the outer diameter of the brake disk;

advancing said one of the tool bits until initial contact is made with a corresponding one of the disk surfaces and noting the position of said one of the tool bits;

continuing to advance said one of the tool bits until it is in continuous contact with said corresponding one of the disk surfaces and noting the position of said one of the tool bits; and calculating the difference between the position of said one of the tool bits when in initial contact with said corresponding one of the disk surfaces and the position of said one of the tool bits when in continuous contact with said corresponding one of the disk surfaces, this difference being approximately equal to the lateral run-out of the brake disk.

11. A method for machining a brake disk to eliminate lateral run-out, using an on-vehicle disk brake lathe having a lathe axis and a pair of tool bits while the brake disk is mounted to a wheel hub rotatably mounted about a hub axis, the brake disk having a pair of disk surfaces, the method comprising the steps of:

mounting the lathe to the wheel hub;

aligning the lathe axis with the hub axis;

driving the wheel hub to rotate the disk about the hub axis;

positioning the tool bits of the lathe in close proximity to the outer diameter of the brake disk;

advancing the tool bits until initial contact is made with the disk surfaces;

continuing to advance the tool bits until they are in continuous contact with the disk surfaces and noting the positions of the tool bits; and moving the tool bits radially across the disk surfaces.

12. The method of claim 11 further comprising the step of:

noting the positions of the tool bits after said step of advancing the tool bits until initial contact is made with the disk surfaces; and further wherein said step of moving the tool bits radially across the disk surfaces further comprises:

retracting the tool bits away from the disk to a position beyond said positions of initial contact with the disk surfaces;

moving the tool bits radially inwards to the innermost position on the disk surfaces to be machined;

advancing the tool bits to positions corresponding to said positions of continuous contact with the disk surfaces; and moving the tool bits radially outwards to the outer diameter of the disk surfaces.

13. The method of claim 11 further comprising the step of:

after said step of advancing the tool bits to positions corresponding to said positions of continuous contact with the disk surfaces, further advancing the tool bits to increase the depth of cut.

14. The method of claim 11 further comprising the steps of:

retrieving an appropriate thickness specification for the brake disk;

after said step of continuing to advance the tool bits until they are in continuous contact with the disk surfaces, determining a measured thickness value from said noted positions of the tool bits, said measured thickness value being equal to the separation between the tool bits;

comparing said measured thickness value to said thickness specification;

if said measured thickness value does not meet said thickness specification, providing a warning of such; and if said measured thickness value meets said thickness specification, proceeding to said step of moving the tool bits radially across the disk surfaces.

15. The method of claim 14 further comprising the steps of:

after said steps of continuing to advance the tool bits until they are in continuous contact with the disk surfaces and comparing said measured thickness value to said thickness specification, further advancing the tool bits to increase the depth of cut and noting the positions of the tool bits; and determining a new value for said measured thickness value from said noted positions of said tool bits.

16. A method for machining a brake disk to eliminate lateral run-out when the disk thickness and the lateral run-out are known, using an on-vehicle disk brake lathe having a lathe axis and a pair of tool bits while the brake disk is mounted to a wheel hub rotatably mounted about a hub axis, the brake disk having a pair of disk surfaces, the method comprising the steps of:

mounting the lathe to the wheel hub;

aligning the lathe axis with the hub axis;

driving the wheel hub to rotate the disk about the hub axis;

positioning the tool bits of the lathe in close proximity to the outer diameter of the brake disk;

advancing a first of the tool bits until initial contact is made with a corresponding one of the disk surfaces and noting the position of the first of the tool bits;

moving the tool bits radially inwards to the innermost position on the disk surfaces to be machined;

based on said noted position of the first of the tool bits, advancing the tool bits until the first of the tool bits is advanced by an amount at least as great as the lateral run-out and no more than the lateral run-out plus an incremental overcut amount δ, and a second of the tool bits is advanced to a position where, after the first of the tool bits is advanced, the second of the tool bits is separated from the first of the tool bits by an amount no more than the disk thickness minus the lateral run-out and any incremental amount δ; and moving the tool bits radially outwards to the perimeter of the disk surfaces.

17. A system for on-vehicle maintenance of a brake disk, the system comprising:

an on-vehicle brake lathe having tool holders which support disk-engagable tool bits;

means for monitoring the separation between said tool bits;

an operator control panel providing circuitry for allowing an operator to position said tool bits with respect to the brake disk;

a microprocessor communicating with said means for monitoring the separation between said tool bits;

at least one contact sensor for the detection of contact of said tool bits with a body, said at least one contact sensor communicating its information to said microprocessor;

at least one set of instructions responsive to said at least one contact sensor to direct positioning of said tool bits with respect to the brake disk; and a microprocessor interface suitable for inputting brake specifications, said at least one set of instructions for directing the operations of the lathe, and operator instructions provided through said operator control panel.

18. The system of claim 17 wherein said means for monitoring the separation between said tool bits is a displacement gauge, and wherein said at least one set of instructions further comprises:

an instruction set for calibration of said displacement gauge.

19. The system of claim 18 wherein said at least one contact sensor further comprises:

a first contact gauge which monitors a first one of said tool bits;

a second contact gauge which monitors a second one of said tool bits; and wherein said at least one set of instructions further comprises:

an instruction set for determining a depth of cut necessary to eliminate lateral run-out of the brake disk and a final thickness of the brake disk which will result from said depth of cut.

20. The system of claim 19 wherein said at least one set of instructions further comprises:

an instruction set for comparison of the final thickness with an appropriate one of said inputted brake specifications and providing notice of whether the final thickness meets said appropriate one of said inputted brake specifications.

21. The system of claim 20 wherein said at least one set of instructions further comprises:

an instruction set for feeding said tool bits across the disk surfaces to machine the brake disk; and a check to see whether the thickness after machining will meet said appropriate one of said inputted brake specifications and, if met, to execute said instruction set for feeding said tool bits to machine the brake disk.

22. The system of claim 17 further comprising:

a surface displacement gauge fixed with respect to one of said tool holders;

means for positioning said one of said tool holders at a fixed separation from the brake disk such that said surface displacement gauge responds to the separation of said one of said tool holders from the brake disk; and means for interpreting signals from said surface displacement gauge to provide the lateral run-out of the brake disk.

23. The system of claim 22 wherein said at least one set of instructions further comprises;

an instruction set for positioning said tool bits with respect to the disk so as to eliminate said provided lateral run-out when said tool bits are fed across the disk surfaces to machine the disk.

24. The system of claim 23 further comprising:

at least one disk proximity sensor responsive to the approach of said one of said tool holders to the disk; and means responsive to said at least one disk proximity sensor for stopping motion of said one of said tool holders at a predetermined distance from the disk which assures that the separation of said one of said tool holders from the disk remains within the range of said surface displacement gauge.

25. The system of claim 24 wherein said at least one disk proximity sensor further comprises:

a first disk proximity sensor responsive to the separation between a first one of said tool bits, mounted to said one of said tool holders, and the disk;

a second disk proximity sensor responsive to the separation between a second one of said tool bits and the disk; and means for calculating an initial thickness of the disk from, said provided lateral run-out,
the separation between said first one of said tool bits and the disk, and
the separation between said second one of said tool bits and the disk.

26. The system of claim 17 further comprising:

a surface displacement gauge fixable with respect to a plane normal to the hub axis;

means for positioning said surface displacement gauge at a fixed separation from the disk such that said surface displacement gauge responds to the variations in the position of the disk with respect to said plane; and means for interpreting signals from said surface displacement gauge to provide the lateral run-out of the disk.

27. The system of claim 19 further comprising:

means responsive to said first contact gauge for stopping motion of said first one of said tool bits at a predetermined distance from the disk; and means responsive to said second contact gauge for stopping motion of said second one of said tool bits at a predetermined distance from the disk.

28. The system of claim 17 further comprising:

a hub proximity sensor responsive to approach of said tool holders and related structure within a specified distance from a wheel hub or any other part of the vehicle.

29. An improved on-vehicle disk brake lathe which attaches to a wheel hub having a brake disk attached thereto, the wheel hub having a hub axis about which both the wheel hub and the brake disk rotate, the brake disk having a first disk surface and a second disk surface, the disk brake lathe having, a frame attachable to the wheel hub and having a lathe axis, means for aligning the lathe axis with the hub axis, a drive mechanism for rotating the wheel hub about the lathe axis, a first tool bit which is engagable with the first disk surface, a second tool bit which is engagable with the second disk surface, and means for advancing the first tool bit and the second tool bit along a feed path which is normal to the hub axis, the improvement comprising:

a first tool holder for supporting the first tool bit, said first tool holder being translatably engaged with respect to the frame such that it traverses a first tool holder path which is parallel to the lathe axis;

means for moving said first tool holder along said first tool holder path to adjust the spatial separation between the first disk surface and the first tool bit;

a second tool holder for supporting the second tool bit, said second tool holder being translatably engaged with respect to the frame such that it traverses a second tool holder path which is parallel to the lathe axis;

means for moving said second tool holder along said second tool holder path to adjust the spatial separation between the second disk surface and the second tool bit;

a displacement gauge connected between said first tool holder and said second tool holder so as to respond to changes in the spatial separation therebetween.

30. The improved on-vehicle disk brake lathe of claim 29 wherein the lathe further has, a cutting tool assembly on which the first tool bit and the second tool bit are mounted, the cutting tool assembly having a platform which is mounted to the frame of the lathe, and wherein the means for advancing the first tool bit and the second tool bit along a feed path which is normal to the hub axis comprises, means for advancing the platform along the feed path which is normal to the hub axis, the improvement further wherein, said first tool holder is translatably engaged with respect to the platform so as to be translatable with respect to the frame along said first tool holder path; and said second tool holder is translatably engaged with respect to the platform so as to be translatable with respect to the frame along said second tool holder path.

31. The improved disk brake lathe of claim 29 wherein the improvement further comprises:

means for coordinating movement of said first tool holder along said first tool holder path with movement of said second tool holder along said second tool holder path.

32. The improved disk brake lathe of claim 30 wherein the improvement further comprises:

means for coordinating movement of said first tool holder along said first tool holder path with movement of said second tool holder along said second tool holder path.

33. The improved disk brake lathe of claim 31 wherein said means for coordinating movement of said first tool holder with movement of said second tool holder is provided by means for operating said means for moving said first tool holder along said first tool holder path and said means for moving said second tool holder along said second tool holder path in a coordinated manner.

34. The improved disk brake lathe of claim 32 wherein said means for coordinating movement of said first tool holder with movement of said second tool holder is provided by means for operating said means for moving said first tool holder along said first tool holder path and said means for moving said second tool holder along said second tool holder path in a coordinated manner.

35. The improved disk brake lathe of claim 31 wherein the lathe further comprises:

a platform which translatably engages the lathe frame so as to traverse the feed path which is normal to the hub axis, further wherein the means for advancing the first tool bit and the second tool bit along a feed path which is normal to the hub axis comprises, means for advancing the platform along the feed path which is normal to the hub axis, and still further wherein said means for coordinating movement of said first tool holder with movement of said second tool holder further comprises:

a support plate which translatably engages the platform and traverses a support plate path which is normal to the feed path and parallel to the lathe axis, said support plate having at least one of said tool holders translatably mounted thereon; and means for moving said support plate with respect to the platform so as to adjust the axial position of both of said tool holders with respect to the disk surfaces.

36. The improved disk brake lathe of claim 32 wherein said means for coordinating movement of said first tool holder with movement of said second tool holder further comprises:

a support plate which translatably engages the platform and traverses a support plate path which is normal to the feed path and parallel to the lathe axis, said support plate having at least one of said tool holders translatably mounted thereon; and means for moving said support plate with respect to the platform so as to adjust the axial position of both of said tool holders with respect to the disk surfaces.

37. The improved disk brake lathe of claim 36 wherein the improvement further comprises:

locking means for preventing motion of said first tool holder along said first tool holder path, and to prevent motion of said second tool holder along said second tool holder path.

* * * * *